(12) United States Patent
Koishi

(10) Patent No.: US 8,310,571 B2
(45) Date of Patent: Nov. 13, 2012

(54) COLOR SHADING CORRECTION DEVICE, COLOR SHADING CORRECTION METHOD, AND COLOR SHADING CORRECTION PROGRAM

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 767 days.

(21) Appl. No.: 12/222,026

(22) Filed: Jul. 31, 2008

(65) Prior Publication Data

US 2009/0002526 A1    Jan. 1, 2009

Related U.S. Application Data

(63) Continuation of application No. PCT/JP2007/051781, filed on Feb. 2, 2007.

(30) Foreign Application Priority Data

Feb. 3, 2006 (JP) ................................ 2006-026679

(51) Int. Cl.
*H04N 9/64* (2006.01)
*H04N 5/202* (2006.01)
*G06K 9/40* (2006.01)

(52) U.S. Cl. ......... 348/251; 348/241; 382/254; 382/274

(58) Field of Classification Search .................. 348/251, 348/241, 246; 382/254, 274
See application file for complete search history.

(56) References Cited

U.S. PATENT DOCUMENTS

| 5,602,412 | A | 2/1997 | Suzuki et al. | |
| 6,181,830 | B1* | 1/2001 | Sato | 382/274 |
| 2001/0028391 | A1 | 10/2001 | Iko | |
| 2002/0094131 | A1 | 7/2002 | Shirakawa | |
| 2004/0141087 | A1 | 7/2004 | Oda et al. | |
| 2004/0155970 | A1* | 8/2004 | Johannesson et al. | 348/231.6 |
| 2004/0239784 | A1 | 12/2004 | Ibe | |
| 2005/0089241 | A1* | 4/2005 | Kawanishi et al. | 382/274 |
| 2005/0275904 | A1 | 12/2005 | Kido et al. | |

FOREIGN PATENT DOCUMENTS

| JP | A-04-231930 | 8/1992 |
| JP | A-05-236338 | 9/1993 |
| JP | A-06-178198 | 6/1994 |
| JP | A-06-197266 | 7/1994 |
| JP | A-06-311422 | 11/1994 |

(Continued)

OTHER PUBLICATIONS

European Search Report issued in corresponding European Patent Application No. 07707944.0, mailed Jun. 7, 2010.

*Primary Examiner* — Aung S Moe
*Assistant Examiner* — Mekonnen Dagnew
(74) *Attorney, Agent, or Firm* — Oliff & Berridge, PLC

(57) ABSTRACT

An image processing device that performs color shading correction on an image formed by a plurality of pixel signals with correction data includes: a correction execution decision unit that decides whether or not color shading correction is to be executed for each pixel signal in order to perform color shading correction for a part of the plurality of pixel signals and not to perform color shading correction for another part of the plurality of pixel signals; and a correction unit that performs correction of the pixel signal of which execution of correction is decided by the correction execution decision unit for each color component thereof.

15 Claims, 18 Drawing Sheets

FOREIGN PATENT DOCUMENTS

| | | |
|---|---|---|
| JP | A 2000-041179 | 2/2000 |
| JP | A-2000-196953 | 7/2000 |
| JP | A 2000-324505 | 11/2000 |
| JP | A 2001-281554 | 10/2001 |
| JP | A-2002-185971 | 6/2002 |
| JP | A-2005-151036 | 6/2005 |
| JP | A-2005-252023 | 9/2005 |
| JP | A 2005-278004 | 10/2005 |
| JP | A 2006-050040 | 2/2006 |
| JP | A 2006-101115 | 4/2006 |

\* cited by examiner

FIG.8

TABLE 1 CALCULATION TABLE FOR EXIT PUPIL POSITION $P_0$ OF LENS TYPE ①

| FOCAL LENGTH \ CAMERA-TO-SUBJECT DISTANCE | MINIMAL CAMERA-TO-SUBJECT DISTANCE $d_{min}$ | ... | 3 [m] | 5 [m] | ... | INFINITY $d_{max}$ |
|---|---|---|---|---|---|---|
| $f_0$ [m] | $P_{11}$ | ... | $P_{12}$ | $P_{13}$ | ... | $P_{14}$ |
| ... | ... | ... | ... | ... | ... | ... |
| 40 [m] | $P_{21}$ | ... | $P_{22}$ | $P_{23}$ | ... | $P_{24}$ |
| 60 [m] | $P_{31}$ | ... | $P_{32}$ | $P_{33}$ | ... | $P_{34}$ |
| ... | ... | ... | ... | ... | ... | ... |
| $f_1$ [m] | $P_{41}$ | ... | $P_{42}$ | $P_{43}$ | ... | $P_{44}$ |

FIG.9A

TABLE 2 CALCULATION TABLE FOR COEFFICIENT a OF R GAIN FUNCTION (r)
(CORRECTION DATA FOR CAMERA TYPE A)

| APERTURE VALUE (F VALUE) \ EXIT PUPIL POSITION | ... | $P_1$ | $P_2$ | ... | $P_{max}$ |
|---|---|---|---|---|---|
| 1.4 | ... | $a_{11}$ | $a_{12}$ | ... | $a_{13}$ |
| ... | ... | ... | ... | ... | ... |
| 4 | ... | $a_{21}$ | $a_{22}$ | ... | $a_{23}$ |
| ... | ... | ... | ... | ... | ... |
| 22 | ... | $a_{31}$ | $a_{32}$ | ... | $a_{33}$ |

FIG.9B

TABLE 3 CALCULATION TABLE FOR COEFFICIENT b OF R GAIN FUNCTION (r)
(CORRECTION DATA FOR CAMERA TYPE A)

| APERTURE VALUE (F VALUE) \ EXIT PUPIL POSITION | ... | $P_1$ | $P_2$ | ... | $P_{mbx}$ |
|---|---|---|---|---|---|
| 1.4 | ... | $b_{11}$ | $b_{12}$ | ... | $b_{13}$ |
| ... | ... | ... | ... | ... | ... |
| 4 | ... | $b_{21}$ | $b_{22}$ | ... | $b_{23}$ |
| ... | ... | ... | ... | ... | ... |
| 22 | ... | $b_{31}$ | $b_{32}$ | ... | $b_{33}$ |

FIG.9C

TABLE 4 CALCULATION TABLE FOR COEFFICIENT c OF B GAIN FUNCTION (r)
(CORRECTION DATA FOR CAMERA TYPE A)

| APERTURE VALUE (F VALUE) \ EXIT PUPIL POSITION | ... | $P_1$ | $P_2$ | ... | $P_{mcx}$ |
|---|---|---|---|---|---|
| 1.4 | ... | $c_{11}$ | $c_{12}$ | ... | $c_{13}$ |
| ... | ... | ... | ... | ... | ... |
| 4 | ... | $c_{21}$ | $c_{22}$ | ... | $c_{23}$ |
| ... | ... | ... | ... | ... | ... |
| 22 | ... | $c_{31}$ | $c_{32}$ | ... | $c_{33}$ |

FIG.9D

TABLE 5 CALCULATION TABLE FOR COEFFICIENT d OF B GAIN FUNCTION (r)
(CORRECTION DATA FOR CAMERA TYPE A)

| APERTURE VALUE (F VALUE) \ EXIT PUPIL POSITION | ... | $P_1$ | $P_2$ | ... | $P_{mdx}$ |
|---|---|---|---|---|---|
| 1.4 | ... | $d_{11}$ | $d_{12}$ | ... | $d_{13}$ |
| ... | ... | ... | ... | ... | ... |
| 4 | ... | $d_{21}$ | $d_{22}$ | ... | $d_{23}$ |
| ... | ... | ... | ... | ... | ... |
| 22 | ... | $d_{31}$ | $d_{32}$ | ... | $d_{33}$ |

US 8,310,571 B2

COLOR SHADING CORRECTION DEVICE, COLOR SHADING CORRECTION METHOD, AND COLOR SHADING CORRECTION PROGRAM

This application is a continuation of International Application No. PCT/JP 2007/051781 filed Feb. 2, 2007

INCORPORATION BY REFERENCE

The disclosures of the following applications are herein incorporated by reference:
Japanese Patent Application No. 2006-026679 filed Feb. 3, 2006
International Application No. PCT/JP 2007/051781 filed Feb. 2, 2007

BACKGROUND OF INVENTION

1. Field of the Invention

The present invention relates to an image processing device, an image processing method, and an image processing program that perform color shading correction of photographic images.

2. Description of Related Art

A camera is known which corrects color shading, i.e., becoming reddish or bluish in a peripheral part as compared with a central part of an image, depending on an aperture value, an exit pupil distance, and a distance from a center of an imaging area of a photographic lens (see, for example, Patent Reference 1). This camera retrieves aperture-dependent characteristics information that depends on the aperture value upon imaging and shading correction information that depends on exit pupil distance and exit pupil diameter upon imaging from a table for a microlens and calculates R, G, and B gain control amounts based on the focal length and lens characteristics information (information indicating characteristics of peripheral light reduction).

Patent Reference 1: Japanese Laid-Open Patent Application No. 2000-324505.

SUMMARY OF THE INVENTION

However, there arises a problem that calculation of correction data for each of R, G, and B colors on the whole screen depending on photographic conditions and distance from the center of the screen (image height) and performance of correction based on the calculated data result in an increase in the amount of calculation, so that load of the correction processing is increased.

In addition, an aperture-dependent characteristics information table and a shading characteristics information table in accordance with the characteristics of microlenses preliminarily mounted in each camera are kept in the camera. As a result, a large capacity memory is necessary for recording a large number of tables for preparing correction data.

On the other hand, when the cameras of the same model are used, sufficient correction cannot be performed if color shading occurs different in different camera due to individual variability.

According to a first aspect of the present invention, an image processing device that performs color shading correction on an image formed by a plurality of pixel signals with correction data, the device includes: a correction execution decision unit that decides whether or not color shading correction is to be executed for each pixel signal in order to perform color shading correction for a part of the plurality of pixel signals and not to perform color shading correction for another part of the plurality of pixel signals; and a correction unit that performs correction of the pixel signal of which execution of correction is decided by the correction execution decision unit for each color component thereof.

According to a second aspect of the present invention, it is preferred that in the image processing device of the first embodiment, the pixel signal for which color shading correction is to be executed forms respectively peripheral area of the image, and the pixel signal for which color shading correction is not to be executed forms respectively central area of the image.

According to a third aspect of the present invention, it is preferred that the image processing device of the first embodiment further includes: a correction data decision unit that decides the correction data for each color component of the pixel signal using an optical photographic condition when a correction target image is obtained, and in this device the correction execution decision unit decides whether or not correction is to be executed for each pixel signal that forms the correction target image depending on the optical photographic condition; and the correction unit performs correction of the pixel signal of which execution of correction is decided by the correction execution decision unit for each color component thereof based on the correction data.

According to a fourth aspect of the present invention, it is preferred that in the image processing device of the third embodiment the optical photographic condition includes an exit pupil position and an aperture value when the correction target image is obtained, the correction execution decision unit decides whether or not correction is to be executed for each of the pixel signals that form the correction target image depending on the exit pupil position and the aperture value, and the correction unit performs correction of the pixel signal of which execution of correction is decided by the correction execution decision unit for each color component based on the correction data.

According to a fifth aspect of the present invention, it is preferred that in the image processing device of the forth embodiment, the correction execution decision unit decides that correction is to be executed when each pixel that constitutes the image sensor has an image height larger than a predetermined value determined depending on the exit pupil position and the aperture value.

According to a sixth aspect of the present invention, an image processing device that performs color shading correction on an image formed by a plurality of pixel signals with correction data, the device includes: a correction data obtaining unit that obtains the correction data suitable for an optical photographic condition for each of the plurality of pixel signals using a first image obtained by photography of a subject having a color distribution that is known in advance; and a correction unit that corrects a plurality of pixel signals that form a second image for each color component thereof based on an optical photographic condition when the second image is obtained and the correction data.

According to a seventh aspect of the present invention, it is preferred that in the image processing device of the sixth embodiments, the correction data obtaining unit obtains the correction data for each color component suitable for a predetermined optical photographic condition for each of the plurality of pixel signals using the first image obtained by photography of the subject having a known color distribution under the predetermined optical photographic condition, and the correction unit corrects for each color component a plurality of image signals that form the second image obtained under the same optical photographic condition as the predetermined optical photographic condition based on the correction data.

According to an eighth aspects of the present invention, it is preferred that the image processing device of the sixth embodiments further includes an updating unit that updates data relating to correction stored in advance based on the first image to generate the correction data, and in this device the correction unit corrects for each color component a plurality of pixel signals that form the second image based on the optical photographic condition when the second image is obtained and the updated correction data.

According to a ninth aspect of the present invention, it is preferred that in the image processing device of the sixth to the eighth embodiments, the subject having a known color distribution is a chart having a uniform color distribution.

According to a tenth to an eighteenth aspect of the present invention, an image processing method performs processing that corresponds to the image processing device according to any one of the first to the ninth embodiments.

According to a nineteenth aspect of the present invention, an image processing program causes a computer to execute an image processing method according to any one of the tenth to the eighteenth aspects.

BRIEF DESCRIPTION OF THE DRAWINGS

FIG. 8 presents a calculation table for calculating an exit pupil position for each lens model, which is a data for correction necessary for obtaining color shading;

FIGS. 9A to 9D present calculation tables for calculating, FIG. 9A illustrating coefficient a of an R gain function, FIG. 9B illustrating coefficient b of the R gain function, FIG. 9C illustrating coefficient c of the B gain function, and FIG. 9D illustrating coefficient d of the B gain function, which are each a data for correction necessary for obtaining color shading;

DESCRIPTION OF PREFERRED EMBODIMENTS

First Embodiment

Figure 1:
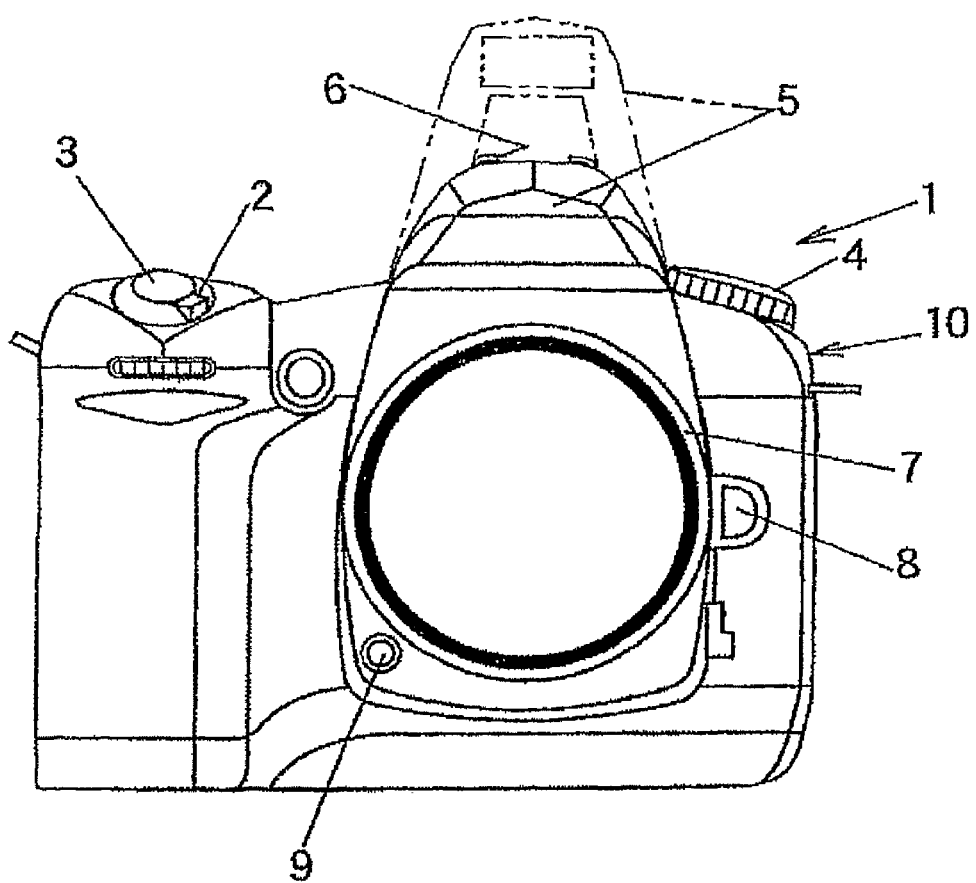
FIG. 1 is an external view of an electronic camera according to an embodiment of the present invention.

Referring to FIGS. 1 to 10, a camera having mounted thereon the image processing device according to a first embodiment of the present invention is described. As shown in FIG. 1, an electronic camera 1 includes a camera body 10, on an upper surface of which are provided a main switch (power switch) 2 that turns ON/OFF power supply to the electronic camera 1, a release button 3 that instructs photographing, a mode dial 4 for setting photographic conditions and action modes such as a photographic mode and a reproduction mode, a built-in flash unit 5 that illuminates a subject, and an accessory shoe for attaching a detachable external flash device to the camera body 10.

On a front face of the camera body 10, there are provided a mount 7 for mounting thereon an interchangeable lens, a dismounting button 8 for dismounting the interchangeable lens mounted on the mount 7, and a preview button 9 for performing a preview action by which an aperture of the interchangeable lens is reduced to a set aperture or a controlled aperture before image capturing. On a rear face of the camera body 10, there are provided a finder (not shown) through which a subject image before image capturing is confirmed and a liquid crystal monitor (not shown) that displays the captured image and various settings.

Figure 2:
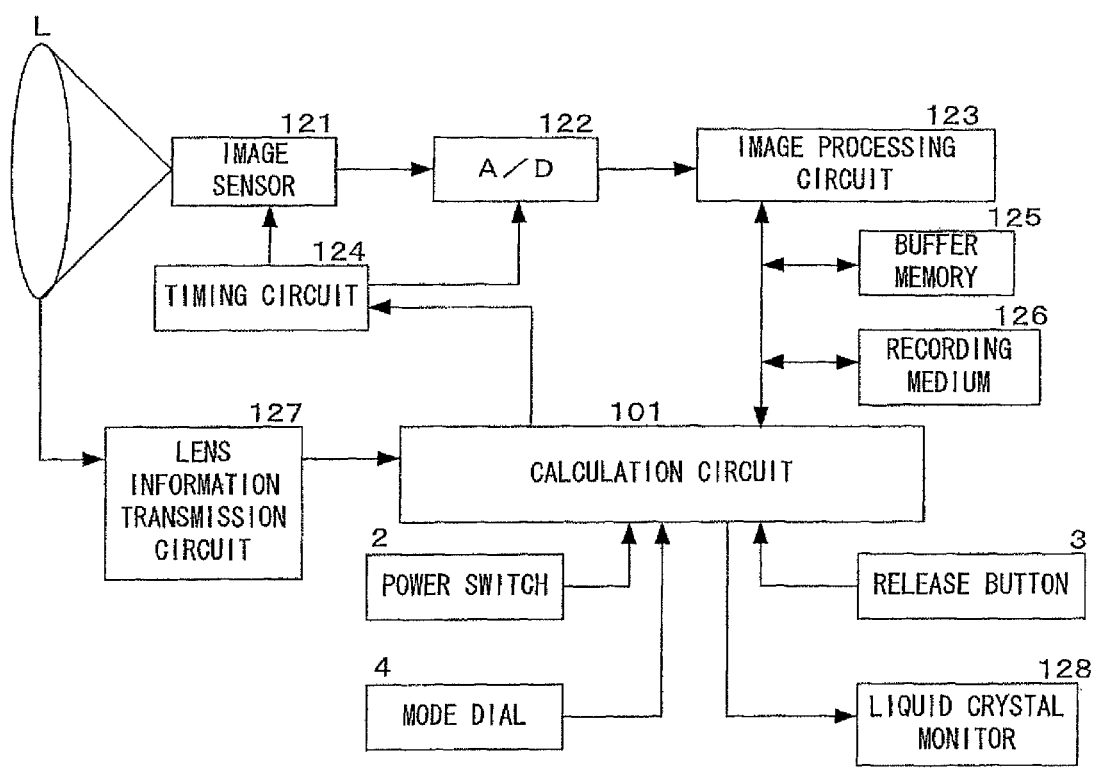
FIG. 2 is a block diagram illustrating the electronic camera according to the embodiment of the present invention.

FIG. 2 is a block diagram illustrating a control system of the electronic camera 1. A calculation circuit 101 includes a micro computer and so on. The calculation circuit 101 performs predetermined calculations based on signals output from various circuits and components detailed hereinbelow and input to the calculation circuit and outputs control signals based on the results of the calculations to the various circuits and components.

An image sensor 121 includes, for example, a CCD image sensor or a CMOS image sensor. The image sensor 121 captures an image formed by light from a subject that passes through an interchangeable lens L for photographing and outputs an image signal to an A/D conversion circuit 122. The A/D conversion circuit 122 converts analog image signals to digital signals. The image sensor 121 and the A/D conversion circuit 122 are each driven at predetermined action timing by a drive signal output from the timing circuit 124. A lens information transmission circuit 127 outputs to the calculation circuit 101 lens information including a lens type, a focal length, a lens position (camera-to-subject distance) and so on that have been input through the mount 7.

An image processing circuit 123 includes ASIC and so on. The image processing circuit 123 performs, besides image processing such as white balance processing to image data after conversion into digital data, compression processing in which the image data after the image processing is compressed, and expansion processing in which the compressed image data are expanded. A buffer memory 125 temporarily stores image data to be processed by the image processing circuit 123. A recording medium 126 records the image data after the image processing. A liquid crystal monitor 128 displays an image corresponding to the image data stored in the buffer memory 125 according to various settings and the above-mentioned action and in a reproduction mode, displays an image corresponding to the image data recorded in the recording medium 126.

Figure 3:
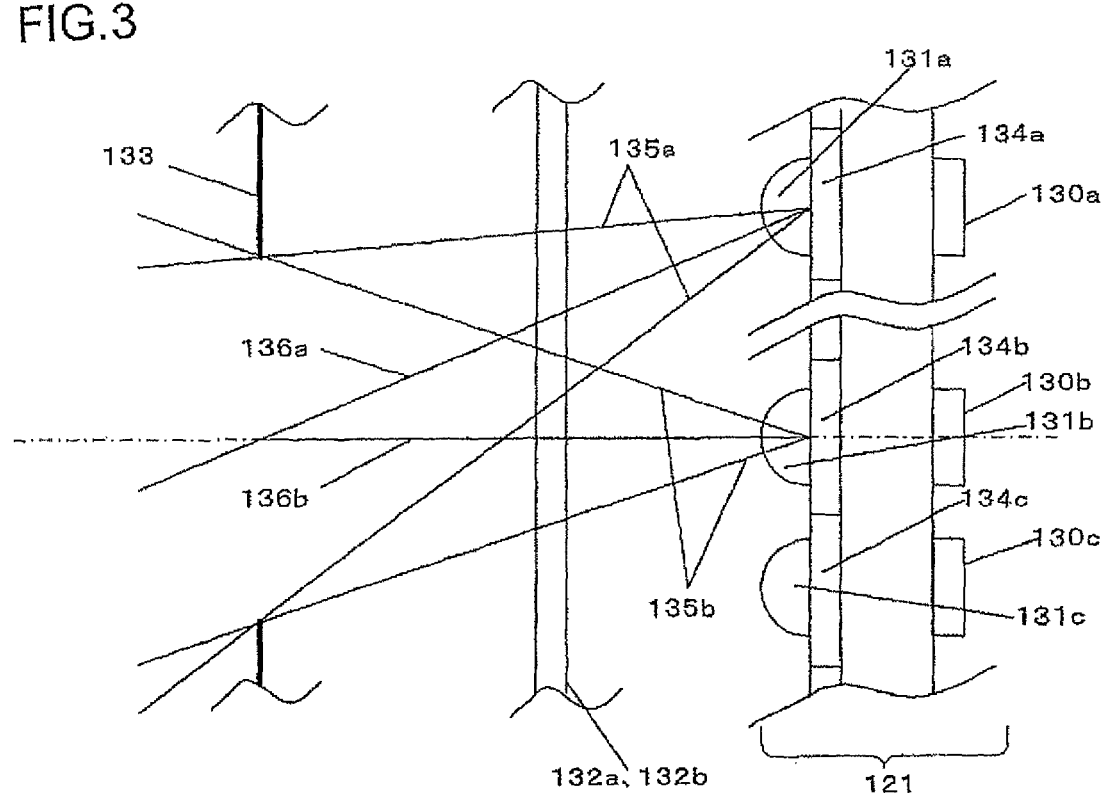
FIG. 3 illustrates the configuration in the vicinity of an image sensor in the electronic camera according to the present invention.

FIG. 3 schematically shows the configuration of a periphery of the image sensor 121 and a variation of inclination of incident light to the image sensor 121. FIG. 3 shows three photodiodes 130a to 130c (hereinafter, 130 is assigned when generically named) of the image sensor 121 and R, G, and B color filters 134a to 134c (hereinafter, 134 is assigned when generically named). The color filters 134a to 134c include microlenses 131a to 131c (hereinafter, 131 is assigned when generically named), respectively, on front faces thereof in order to increase light receiving sensitivity. Each pixel of the image sensor 121 includes a photodiode 130, a color filter 134, and a microlens 131 and so on. The microlenses 131 include on their front face, i.e., on the side of a subject various filters such as an infrared ray cut filter 132a and an ultraviolet ray cut filter 132b. The filters 132a and the 132b are generically named a filter 132. The filter 132 includes a glass plate coated with a thin film coat. Note that 133 designates an exit pupil of the interchangeable lens attached to the camera.

As can be seen from FIG. 3, the inclination of main light 136b of light 135b that is incident to a pixel in the vicinity of the optical axis is approximately parallel to the optical axis. The inclination of the main light 136a of the light 135a that is incident to a pixel in the peripheral part of the screen is a predetermined angle. This inclination is larger for the pixel closer to the peripheral part of the screen.

When photographic light enters each photodiode in the peripheral part of the screen and if the incident angle of the light to the microlens 131 and the filter 132 disposed in the front of each photodiode increases, for example, to such an extent that the inclination of the incident light relative to the optical axis becomes outside a range of angle in which the microlens 131 can collect light, the quantity of light incident to the pixel decreases. The microlens 131 is constituted by a material having a distributed refractive index, so that in a precise sense, the range of angle in which the microlens 131 can collect light differs depending on the wavelength of the light. Therefore, loss amounts of the quantities of R, G, and B lights differ from each other, and this causes color shading to occur. The color shading has an increasing influence at an increasing aperture value (F number). In addition, the color shading provides different influences since the position of exit pupil 133 is different depending on lens model and camera-to-subject distance and the inclination of the incident light is changed. That is, the color shading has a different influence depending on optical photographic conditions. Also, the color shading has different characteristics depending on the model of the camera since it also depends on the characteristics of the microlens 131.

On the other hand, the filter 132 has a spectral transmittance that depends on the incident angle of the light. This also yields color shading. This will be explained referring to FIGS. 4 to 6.

Figure 4:
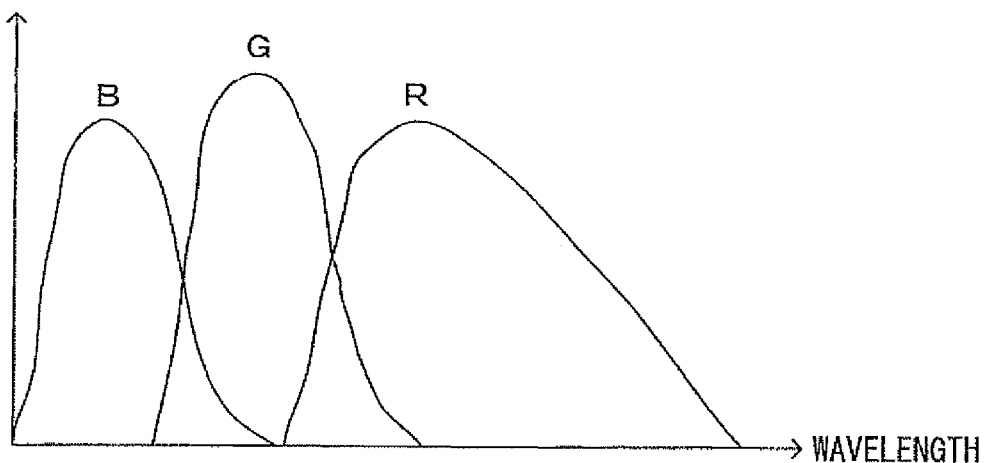
FIG. 4 illustrates the spectral sensitivity of the image sensor.
Figure 5:
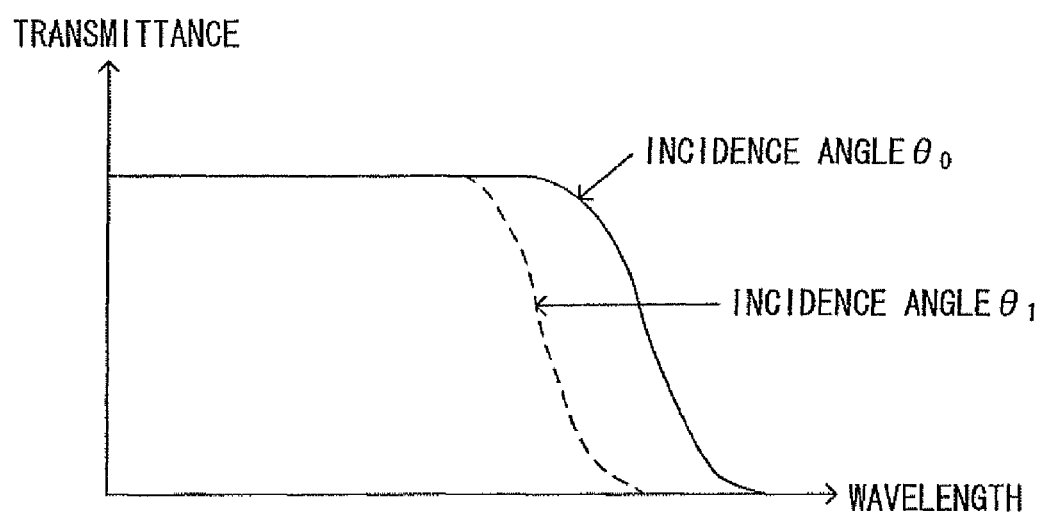
FIG. 5 illustrates an example in which the transmittance of an infrared cut filter varies depending on the incidence angle.

FIG. 4 shows the spectral sensitivity of the image sensor 121 that includes the photodiode 130, the color filter 134, and the microlens 131. FIG. 5 shows how the spectral transmittance of the infrared ray cut filter 132a varies depending on incidence angle ($\theta_0$, $\theta_1$). The spectral sensitivity of the image sensor 121 that includes the photodiode 130, the color filter 134, and the microlens 131 and the spectral sensitivity of the image sensor 121 with the infrared ray cut filter 132a are each determined by a product of the graph shown in FIG. 4 by the graph shown in FIG. 5, respectively.

Figure 6:
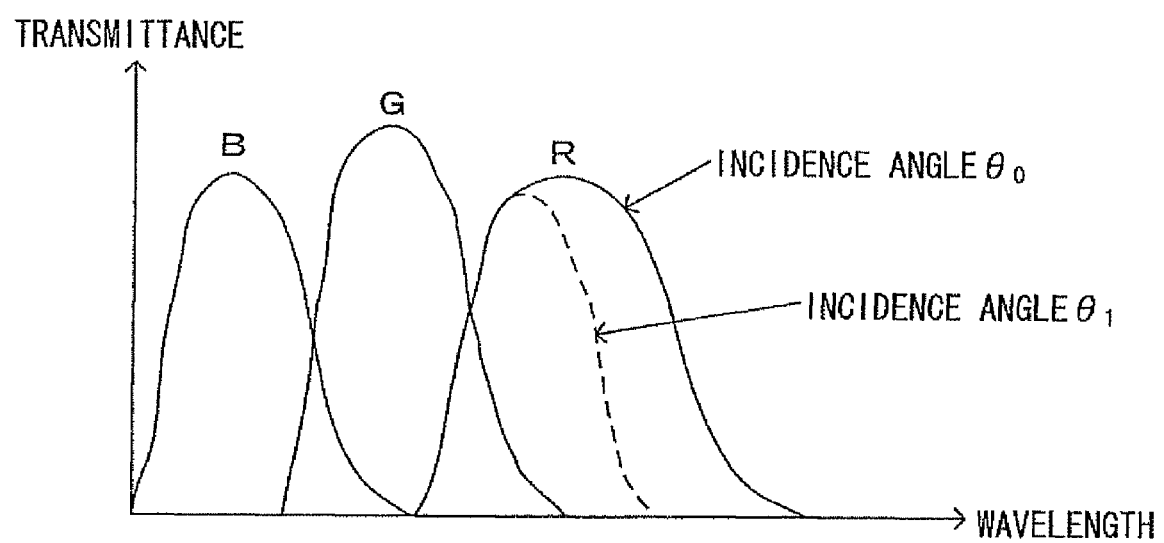
FIG. 6 illustrates the variation of spectral sensitivity of an image sensor depending on the incidence angle due to the characteristics of the infrared cut filter and of the color filter.

FIG. 6 shows the spectral sensitivity on this occasion for each incidence angle. The values of integral of the graphs shown in FIG. 6 correspond to light quantities of a red component (hereinafter referred to as R), a green component (hereinafter referred to as G), and a blue component (hereinafter referred to as B) of each pixel. This indicates that only the light quantity of R varies depending on the incidence angle of photographic light. Note that for the sake of simplicity, influences by the ultraviolet ray cut filter 132b and other constituent elements are neglected in FIG. 6. In the case of the image sensor 121 provided with the ultraviolet ray cut filter 132b, the spectral sensitivity on the shorter wavelength side is also varied depending on the incidence angle to give influences similar to that in the case of the infrared ray cut filter 132a to the shorter wavelength side.

Figure 7:
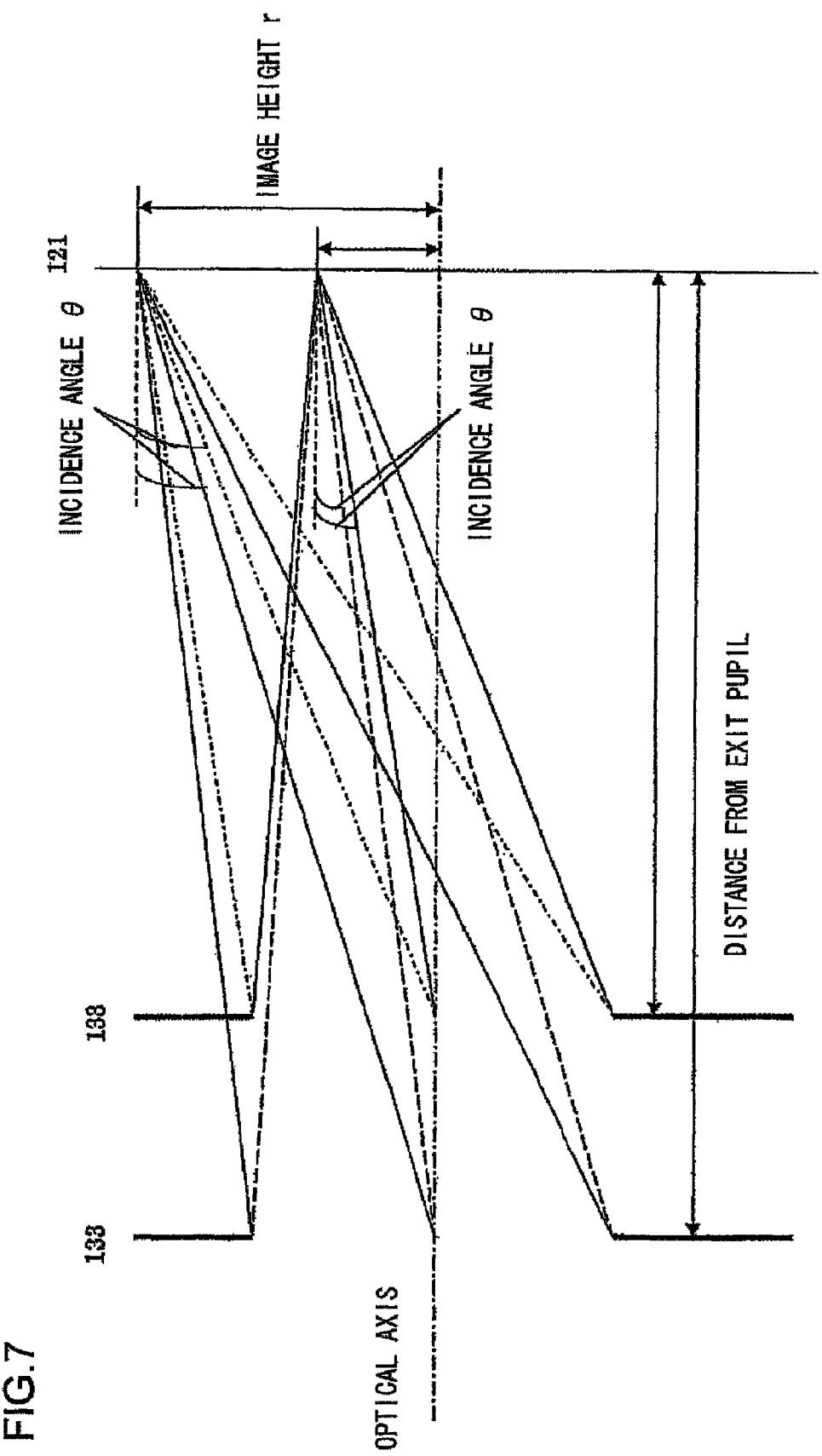
FIG. 7 illustrates dependence of the incidence angle to the image sensor on the exit pupil distance and the distance from the image sensor as well as the image height.

As mentioned above, the quantity of the light incident to the photodiode 130 depends on the incidence angle of the photographic light incident to each microlens 131 and each filter 132. The incidence angle of the light incident to each microlens 131 or each filter 132 is greater at a greater image height as shown in FIG. 7 assuming that the exit pupil position and the aperture diameter are not changed. The incidence angle θ varies depending on optical photographic conditions such as exit pupil position, aperture value, and so on. Therefore, the incidence angle θ can be defined in terms of three variables, i.e., exit pupil position, aperture value, and image height. In the present embodiment, the interchangeable lens calculates an exit pupil position referring to Table 1 shown in FIG. 8 stored in an ROM inside the interchangeable lens. That is, the interchangeable lens calculates the exit pupil position based on the focal length and the camera-to-subject distance, which are optical photographic conditions, referring to Table 1.

Based on the exit pupil position calculated in this manner and the aperture value upon photography, the calculation circuit 101 calculates coefficient "a" of R-gain(r) referring to Table 2 shown in FIG. 9A and coefficient "b" of R-gain(r) referring to Table 3 shown in FIG. 9B. The calculation circuit 101 calculates coefficient "c" of B-gain(r) referring to Table 4 shown in FIG. 9C and coefficient "d" of B-gain(r) referring to Table 5 shown in FIG. 9D. Tables 2 to 5 are calculation tables for calculating coefficients corresponding to camera models used in photographing.

By using the coefficients "a" to "d" calculated in this manner, an R-gain-function(r) and a B-gain-function(r) represented by the following formulae (1) and (2), respectively, are calculated.

$$R\text{-gain-function}(r) = ar + b \quad (1)$$

$$B\text{-gain-function}(r) = cr + d \quad (2)$$

In the above formulae, r represents image height of each pixel (distance from an optical axis of the interchangeable lens attached to the camera to each pixel).

Based on the formulae (1) and (2) above, the R-gain(r) and the B-gain(r) are calculated for each photodiode, in other words, for each pixel using its image height r, and an output value (pixel value) Sout of each photodiode is corrected for each color component according to the following formulae (3) and (4), respectively.

$$R \text{ pixel value after correction} = (R \text{ pixel value before correction } Sout) \times (R\text{-gain}(r)) \quad (3)$$

$$B \text{ pixel value after correction} = (B \text{ pixel value before correction } Sout) \times (B\text{-gain}(r)) \quad (4)$$

In the present embodiment, color shading correction is performed and it is sufficient that a relative amount based on G signal as a standard is corrected. Therefore, G signals are not corrected based on incidence angle. However, G signals may be subjected to luminance shading correction in the same manner as conventionally. When luminance shading correction is additionally performed, all the R, G, and B signals are multiplied by respective correction functions. Assuming that the luminance shading correction function is f(r), the formulae (3) and (4) are converted into formulae (5) to (7).

$$R \text{ pixel value after correction} = (R \text{ pixel value before correction } Sout) \times (R\text{-gain}(r)) \times f(r) \quad (5)$$

$$G \text{ pixel value after correction} = (G \text{ pixel value before correction } Sout) \times f(r) \quad (6)$$

$$B \text{ pixel value after correction} = (B \text{ pixel value before correction } Sout) \times (B\text{-gain}(r)) \times f(r) \quad (7)$$

The focal length, camera-to-subject distance, and aperture value, which are optical photographic conditions upon photography, are transmitted as lens information from the lens to the camera body. Determination of a lens is performed by transmission of a unique identification number assigned to each interchangeable lens from the lens to the camera body. Table 1 is recorded in the ROM on the lens side. Upon photography, an exit pupil position depending on optical photographic conditions (focal length and camera-to-subject distance) is calculated on the lens side and the calculated exit pupil position is transmitted to the camera body. In a predetermined recording region of the calculation circuit 101, there is preliminarily stored Table 2 to Table 5 depending on the model of the electronic camera 1. The calculation circuit 101 calculates coefficients a to d based on the aperture values and exit pupil positions transmitted from the lens with reference to Table 2 to table 5. When the lens has no calculation function, Table 1 may be prepared in a number corresponding to the models of the lens that can be attached on the camera body side and the focal length and exit pupil position may be calculated on the camera body side based on the focal length and the camera-to-subject distance set upon photography.

Hereinafter, a preparation method for preparing Tables 2 to 5 above is described. Using a plurality of lenses having different exit pupil positions, a subject such as a grey chart having a uniform color distribution is photographed under uniform illumination while changing the position of the exit pupil 133 and the aperture value. For images obtained by photographing the subject under respective conditions, ratios of R, G, and B, i.e., R/G and B/G are calculated for each pixel value as follows.

That is, for each pixel value, ratios of $R/G(x_0,y_0)$ and $B/G(x_0, y_0)$ at the image center $(x_0,y_0)$ on the optical axis to $R/G(x,y)$ and $B/G(x,y)$, respectively, to prepare R-gain(x,y) and B-gain(x,y), respectively, which are expressed by formulae (8) and (9), respectively, as follows.

$$R\text{-gain}(x,y) = \{R/G(x_0,y_0)\}/\{R/G(x,y)\} \quad (8)$$

$$B\text{-gain}(x,y) = \{B/G(x_0,y_0)\}/\{B/G(x,y)\} \quad (9)$$

In the present embodiment, three image data corresponding to R, G, and B colors, respectively, are used. In the case of the camera with color filters in Bayer arrangement, image data after correction are used. Therefore, $R/G(x_0,y_0)$ represents R pixel value/G pixel value for one pixel located at the image center $(x_0,y_0)$, and $B/G(x_0,y_0)$ represents B pixel value/G pixel value for one pixel located at the image center $(x_0,y_0)$. Similarly, R/G(x,y) represents R pixel value/G pixel value for a pixel located at any position (x,y), and B/G (x,y) represents B pixel value/G pixel value for a pixel located at any position (x,y). When the number of pixels in the vertical or horizontal direction is even, which one of the pixels is located at the image center $(x_0,y_0)$ can not be uniquely determined. In such a case, the pixel value at the image center $(x_0,y_0)$ may be obtained by interpolation using pixel values of a plurality of pixels in the vicinity of the image center.

As mentioned above, considering that the color shading may be deemed to consist mainly of rotationally symmetric components, R-gain(x,y) and B-gain(x,y) can be approximated by functions of image height r. In this case, R-gain(x,y) and B-gain(x,y) need not be analyzed on the image in whole and the range of analysis may be limited only to a first quadrant taking into consideration the rotational symmetry of color shading. The image height r can be expressed by formula (10) below.

$$r = ((x-x_0)^2 + (y-y_0)^2)^{1/2} \quad (10)$$

From the formulae (8), (9), and (10), the R gain and the B gain are approximated by linear functions of the image height r, such as the formulae (1) and (2), respectively. In this case, the coefficients "a", "b", and "c" are calculated by fitting or the like from results of image analysis (R-gain (x,y) and B-gain(x,y)) of respective optical photographic conditions (exit pupil position, aperture value).

In the case of a pixel in the vicinity of optical axis, the influence of the color shading can be ignored since the incident angle of light to the microlens 131 and the infrared ray cut/ultraviolet ray cut filter 132 is small. Assuming the maximum incidence angle at which the influence of color shading can be ignored, that is, the minimum incidence angle at which correction is necessary, is θmin, then gains can be calculated as indicated below using a corresponding image height rmin. When r>rmin, $$R\text{-gain}(r) = ar + b$$

$$B\text{-gain}(r) = cr + d; \text{ and}$$

when r≦rmin, $$R\text{-gain}(r) = B\text{-gain}(r) = 1 \quad (11).$$

Note that the threshold rmin can be calculated from the minimum incidence angle θmin at which color shading correction is necessary, the position of the exit pupil 133 (distance from an image formation plane) $P_0$, and aperture value F upon photography according to the following formula.

$$r\text{min} = P_0 \times [\tan \theta\text{min} - \tan \{\sin^{-1}(1/2F)\}] \quad (12)$$

Therefore, according to the formula (II) above, processing to reflect the results of calculations of the R-gain(r) and the B-gain (r) on image output becomes unnecessary, so that the correction of actual images can be performed efficiently.

The data in Tables 2 to 5 prepared in the above mentioned manner are stored as data for correction in the calculation circuit 101 of the camera. When color shading correction is performed, respective data are referenced to obtain the R gain and the B gain. When there is no data for correction that correspond to actual optical photographic conditions one for one, data having close conditions are used to obtain the R gain and the B gain by interpolation.

Note that since the influence of the color shading largely depends on the characteristic of the image sensor 121 and the characteristics of the filter 132 as mentioned above, the data for correction such as those shown in Tables 2 to 5 are prepared for every image sensor 121 or for every camera model. When the color shading correction is performed by the camera body upon photography by the camera, the camera stores a set of correction data corresponding to each camera and performs a correction using them. On the other hand, when the photographic image is read in by an external calculation device such as a personal computer to perform color shading correction processing therein, correction is performed by using data for correction that depend on the camera model used in the photography. Therefore, it is indispensable that the photographic image data are stored together with appendix information such as exit pupil position (or focal length, camera-to-subject distance, or lens type), aperture value, and camera type. Further, when it is possible to perform color shading correction processing both by the camera body and by the external calculation device, information that discriminates whether or not color shading correction processing has been completed is attached to the image data.

Figure 10:
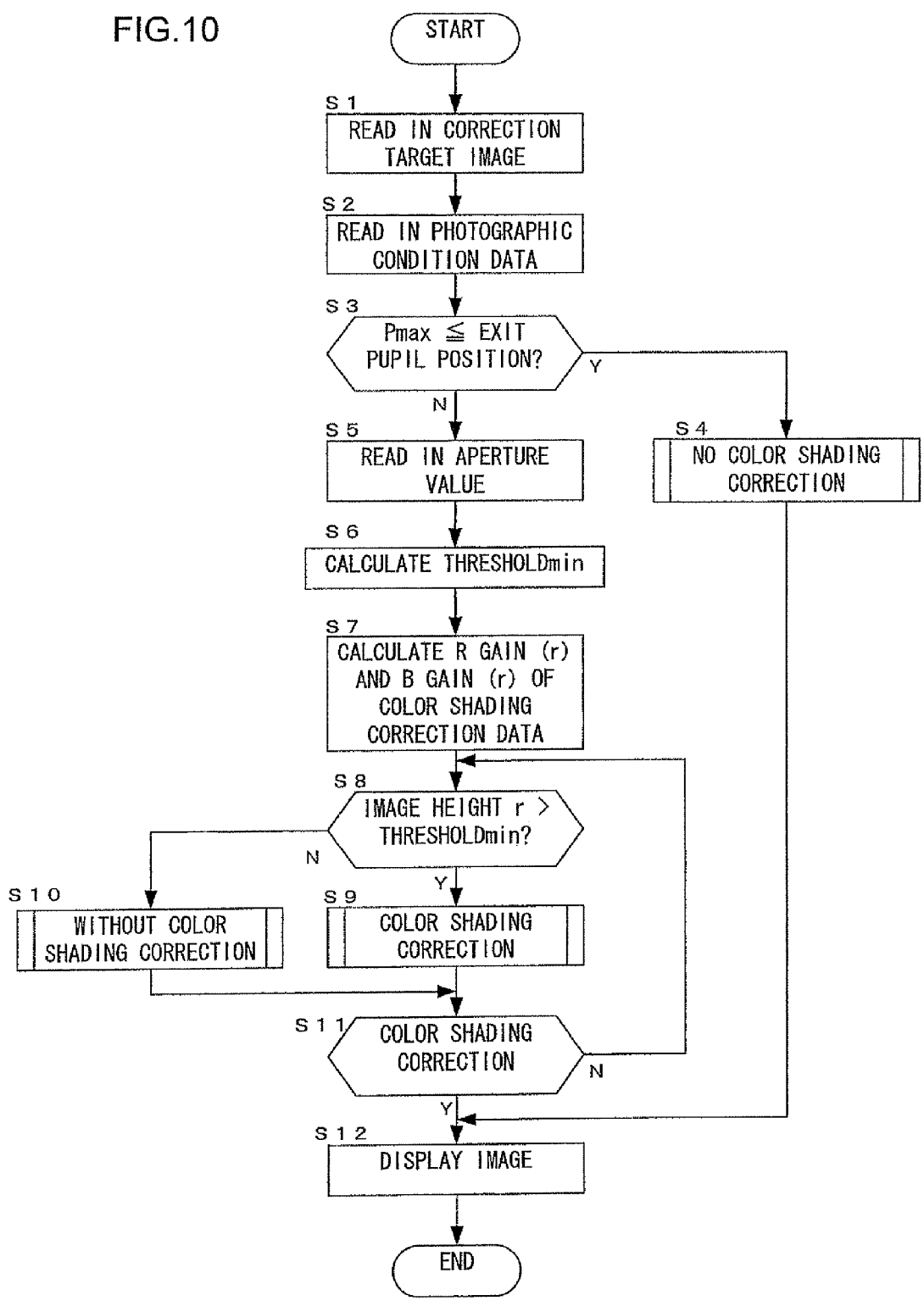
FIG. 10 is a flowchart illustrating color shading correction processing in the first embodiment of the present invention.

The color shading correction action of the electronic camera having the above-mentioned configuration is described referring to the flowchart shown in FIG. 10. Each procedure in FIG. 10 is performed by executing a program in the calculation circuit 101. In the present embodiment, the optical photographic conditions are set as follows.
(1) Name of camera model: A;
(2) Type of camera lens: Lens type I (focal length (zoom) range of $f_0$-$f_1$ mm, Full F value F2.8);
(3) Focal length upon photography: 50 [m];
(4) Camera-to-subject distance: 4 m; and
(5) Aperture value (F value): F4.

In a step S1, an image of which color shading correction is to be performed (correction target image) is read in, and the process is advanced to a step S2. In the step S2, optical photographic conditions, that is, the position of the exit pupil 133, type of lens, focal length, and camera-to-subject distance, transmitted from the interchangeable lens are read in, and the process is advanced to a step S3.

The position of the exit pupil 133 of the lens type I is calculated on the interchangeable lens side by interpolating the position $P_0$ of the exit pupil 133 at a focal length of 50 mm and a camera-to-subject distance of 4 m using data (P22, P23, P32, and P33) for conditions close to the above-mentioned optical photographic conditions (3) and (4).

Note that the image sensor 121 is unique to the camera and hence is not interchangeable. Therefore, on this occasion, Tables 2 to 5 to be used are set depending on the numerical aperture of the microlens 131 and the incidence angle characteristics of the filter 132 that are provided in the camera.

In the step S3, a decision is made as to whether or not the received position $P_0$ of the exit pupil 133 is equal to or larger than a predetermined threshold Pmax. If the result of the decision in the step S3 is YES, that is, if the position $P_0$ of the exit pupil 133 is decided to be equal to or larger than the predetermined threshold Pmax, the process is advanced to a step S4 where no color shading correction is performed, and the process is advanced to a step S12. This is because when the position $P_0$ of the exit pupil 133 is remoter from the image formation plane, the incidence angle is smaller, so that the influence of the color shading can be ignored as is apparent from FIG. 7. If the result of the decision in the step S3 is NO, that is, if the position $P_0$ of the exit pupil 133 is decided to be smaller than the predetermined threshold Pmax, the process is advanced to a step S5.

In the step S5, the aperture value upon photography is read in, and the process is advanced to a step S6. In the step S6, a minimum image height at which correction is necessary (rmin) is determined based on the optical photographic conditions, and the process is advanced to a step S7. The image height rmin is calculated according to the above-mentioned formula (12) using the exit pupil position $P_0$ upon photography of the correction target image that has been read in during the step S2 and the aperture value read in during the step S5.

In the step S7, color shading correction functions at an image height of r, that is, an R-gain-function (r) and a B-gain-function(r) are calculated from the aperture value read in during the step S5 and the position $P_0$ of the exit pupil 133 read in during the step S2 according to the formulae (1) and (2), respectively, after each coefficient is determined referring to Tables 2 to 5.

A more specific example will be explained in which the position $P_0$ of the exit pupil 133 read in during the step S2 is set $P_1 < P_0 < P_2$. First, the above-mentioned coefficients "a", "b", "c", and "d" are obtained referring to Tables 2 to 5. Since the optical photographic conditions are such that the position of the exit pupil 133 is $P_0$ and the aperture value=4, a coefficient $a_0$ is calculated referring to Table 2 by interpolating the coefficient $a_0$ from a coefficient $a_{21}$ for the position $P_1$ of the exit pupil 133 and a coefficient $a_{22}$ for the position $P_2$ of the exit pupil 133. Similarly, a coefficient $b_0$ is calculated from $b_{21}$ and $b_{22}$ referring to Table 3, a coefficient $c_0$ is calculated from $c_{21}$ and $c_{22}$ referring to Table 4, and a coefficient $d_0$ is calculated from $d_{21}$ and $d_{22}$ referring to Table 5. Based above, the color shading correction functions, i.e., R-gain-function (r) and B-gain-function(r), are calculated according to the following formulae (13) and (14), respectively.

$$R\text{-gain-function}(r) = a_0 r + b_0 \qquad (13)$$

$$B\text{-gain-function}(r) = c_0 r + d_0 \qquad (14)$$

In a step S8, the following decision is made for each of the pixels that form correction target images. First, a decision is made whether or not the image height (distance from the optical axis) r of a target pixel is larger than a threshold image height rmin. If the result of the decision is YES, that is, if it is decided that the image height r of the pixel is larger than the threshold rmin, the process is advanced to a step S9. If the result of the decision is NO, that is, if the image height r of the pixel is equal to or smaller than the threshold rmin, the process is advanced to a step S10 in which no color shading correction is performed on the each pixel of which the result of the decision is NO.

In the step S9, respective pixel values, i.e., R value and B value are multiplied by the R-gain-function(r) and the B-gain-function (r), respectively, calculated in the step S7 to perform color shading correction, and the process is advanced to a step S11.

In the step S11, a decision is made as to whether or not color shading correction has been performed for all the pixels that require the color shading correction. If the result of the decision is NO, that is, if it is decided that there is a pixel on which no color shading correction has been made, the process is returned to the step S8. If the result of the decision is YES, that is, if it is decided that color shading correction has been performed for all the pixels that require the color shading correction, the process is advanced to a step S12. In the step S12, the image on which the color shading correction has been performed in the step S9 or the image on which the color shading correction has not been performed in the step S4 is displayed on the crystal monitor 128 and a series of processing is ended.

As described in the above, the camera according to the first embodiment provides the following advantages.

(1) It is configured such that color shading correction is performed on an image formed by a plurality of image signals having color components (R, B, and G in the embodiment). In this case, the calculation circuit 101 makes a decision as to whether or not color shading correction is to be performed for each pixel signal based on optical photographic conditions upon photography of a correction target image (lens type, exit pupil position, and aperture value in the embodiment). The calculation circuit 101 performs color shading correction on a pixel signal of which it has been decided to perform correction for each of the R value and the B value, i.e., for each color component. As a result, correction processing is performed on those pixel signals on which color shading has a significant impact, so that a load on the processing can be decreased to enable high speed processing as compared with the case in which the processing is performed for all the pixel signals.

(2) The numerical aperture of the microlens 131 and the pitch of the microlens 131 are unique for each of the image sensors 121. The color shading occurs due to the incidence angle of light to each pixel of the image sensor 121. Accordingly, in the present embodiment, it is configured such that correction data for the color shading correction are calculated based on various factors that determine the incidence angle to each pixel. As a result, the color shading that occurs in the photographic image can be appropriately corrected even when the photographic flux is incident to each pixel at a different angle depending on the optical photographic conditions.

(3) In the present embodiment, it is configured such that the R-gain-function(r) and the B-gain-function(r) are obtained based on the position of the exit pupil 133 and the aperture value that may vary depending on the optical photographic conditions using data for correction prepared in advance based on the position of the exit pupil 133 and the aperture value for each lens. As a result, the color shading that occurs in the photographic image can be appropriately corrected even when the lens type, the exit pupil position, and the aperture value are different.

(4) The data for color shading correction are prepared as follows. A grey chart having a uniform color distribution is provided in advance and the grey chart is photographed by varying the camera-to-subject distance and the focal length for each lens. To calculate gains of B and R as position functions for respective pixels of the image sensor 121, coefficients "a" to "d" of the B- and R-gain-functions(r) are calculated based on the images obtained by photography of the chart, and the R and B gains, which are correction amounts, are determined for each pixel. Therefore, the color shading that occurs in the photographic image can be appropriately corrected.

(5) It is configured such that when the position of the exit pupil 133 is located at a position farther than the determined threshold, the color shading correction is not performed. This is because the farther the position of the exit pupil 133 is from the image sensor 121, the smaller the incidence angle to the image sensor 121 is and the smaller the influence by the color shading is. Therefore, correction is not performed on the image which is less influenced by color shading, so that the load on processing can be decreased and the correction can be performed efficiently.

(6) It is configured such that the color shading correction is performed only on those pixel signals that are output from pixels in a larger area than the predetermined image height set based on the optical photographic conditions. Even when the position of the exit pupil 133 is the same and the aperture diameter is the same, the farther the position of pixel is from the axis, the larger the incidence angle is, so that the influence of color shading becomes non-negligible. Therefore, pixels of which image correction should be performed are discriminated from pixels of which image correction does not have to be performed depending on the position of the pixel, so that the load on the processing can be decreased and the correction can be performed efficiently at high speed.

(7) Dependence of the spectral transmittances of the infrared cut filter 132*a* and the ultraviolet cut filter 132*b* on incidence angle also constitutes a factor for color shading. As mentioned above, the incidence angle depends on the position of the exit pupil 133, the aperture value, and the position of the pixel, so that correction data obtained from images obtained by photography of a grey chart or the like having a uniform color distribution in advance contains variation of spectral transmittance depending on incidence angles to various filters 132. Therefore, the influences of color shading caused by the characteristics of dependence of the spectral transmittances of the various filters 132 on the incidence angle can be appropriately corrected.

Second Embodiment

In the first embodiment, it is configured such that the data for color shading correction prepared in advance, that is, Tables 1 to 5 are stored in the ROM in the camera or in the lens and the correction data are used to determine the R-gain-function(r) and the B-gain-function(r). Then, the R signal and the B signal are multiplied with the gain of each pixel calculated depending on the image height r.

In contrast thereto, in the second embodiment, a chart having an already known color distribution is photographed, prior to photography of a subject, under the optical photographic conditions of the same lens, the same focal length, the same camera-to-subject distance, and the same aperture diameter as those upon photography of the subject. Based on the obtained chart image, an R-gain-function(x,y) and a B-gain-function(x,y) are calculated at each image position. Then, each pixel value of correction target image photographed under the same optical photographic conditions as those upon photography of the chart image is corrected by the calculated R and B gains.

The personal computer with the image processing device according to the second embodiment of the present invention is described with reference to FIGS. 11 and 12. As shown in the main part configuration diagram in FIG. 11, a personal computer 20 includes an external input circuit 201, a memory 202, a memory unit 203, a keyboard 204, a control circuit 205, and a monitor 206. Image data and optical photographic conditions are input to the external input circuit 201 through the electronic camera 1 connected thereto. The memory 202 includes a program storage area 202A that stores a program for executing color shading correction and a data storage area 202B that stores image data during image processing and the optical photographic condition data. The memory unit 203 can store image data and optical photographic data permanently.

The keyboard 204 is an operation member through which execution of various settings and various processings of the personal computer 20 is instructed. The control circuit 205 includes a CPU or the like and controls respective units that constitute the personal computer 20. When an operation signal output from the keyboard 202 is input to the control circuit 205, the control circuit 205 reads in the program stored in the memory unit 203 in advance and stores a program in the program storage area 202A in the memory 202. Further, the control circuit 205 executes color shading correction processing of a chart image read in from the memory unit 203 or the external input circuit 201 based on the optical photographic condition data separately read in from the memory unit 203 or the external input circuit 201 according to the program. Note that the optical photographic conditions contain the position of exit pupil and the aperture value upon photography of a chart image. The image that has been subjected to correction processing is displayed on the monitor 206.

The method for calculating the R-gain-function(x,y) and the B-gain-function(x,y) by the control circuit 205 will be described as follows. Note that the distribution of respective color components in the chart image is expressed by color distribution data such as R_CHART(x,y), G_CHART(x,y), and B_CHART(x,y), which are stored in the memory unit 203 or the like in the personal computer 20 in advance. The color distribution data are correlated to the chart image and read in by the control circuit 205 as necessary.

The control circuit 205 calculates ratios of R, G, and B, i.e., R/G(x,y), and B/G(x,y) in respective pixel positions (x,y) based on the image signals of the read in chart image. Further, the control circuit 205 calculates ratios of R, G, and B, i.e., R_CHART(x,y)/G_CHART(x,y) and R_CHART(x,y)/B_CHART(x,y) that are expected in respective pixel positions (x,y) based on the color distribution data.

Based on the ratios of R, G, and B in the respective pixel positions (x,y) calculated as mentioned above, the control circuit 205 calculates the R-gain(x,y) and the B-gain(x,y), in the respective pixel positions, i.e., color shading correction data according to formulae (15) and (16) shown below.

$$R\text{-gain}(x,y)=(R\_CHART(x,y)/G\_CHART(x,y))/(R/G(x,y)) \quad (15)$$

$$B\text{-gain}(x,y)=(B\_CHART(x,y)/G\_CHART(x,y))/(B/G(x,y)) \quad (16)$$

On the other hand, when the chart is achromatic such as grey or white and the color distribution is uniform, R_CHART(x,y), G_CHART(x,y), and B_CHART(x,y) are constant in all the pixel positions. That is, ratios of R, G, and B, i.e., R/G(x0,y0) and B/G(x0,y0) in the center position (x0,y0) of the chart image can be expressed by the following formulae (17) and (18), respectively.

$$R/G(x0,y0)=R\_CHART(x,y)/G\_CHART(x,y) \quad (17)$$

$$B/G(x0,y0)=R\_CHART(x,y)/B\_CHART(x,y) \quad (18)$$

Accordingly, when the color distribution of the chart is uniform, the control circuit 205 uses formulae (19) and (20) below obtained by substituting the formulae (17) and (18) into the formulae (15) and (16), respectively, to calculate color shading correction data.

$$R\text{-gain}(x,y)=(R/G(x0,y0))/(R/G(x,y)) \quad (19)$$

$$B\text{-gain}(x,y)=(B/G(x0,y0))/(B/G(x,y)) \quad (20)$$

When a chart image having a uniform color distribution is used as in the formulae (19) and (20) mentioned above, the color shading correction data are expressed as ratios of R, G, and B in the respective pixel positions to R, G, and B in the image center position (x0,y0) of the chart image. Therefore, it is unnecessary to store in advance the color distribution data R_CHART(x,y), G_CHART(x,y), and B_CHART (x,y) of the chart used in photographing the chart image or read them in from outside for correction. This can decrease the load incurred in the correction processing.

The chart used for photographing a chart image may be either a chart that is achromatic such as grey or white having a uniform color distribution or a gradated chart having a nonuniform color distribution so far as the color distribution of the chart is known in advance. Which of the charts is to be used is selected by a user. Therefore, when the chart having a nonuniform color distribution is used, the user performs an operation to instruct read in of color distribution data through the keyboard 204. Alternatively, it may be configured such that the monitor 206 displays an inquiry as to which one of the charts the user uses and when the user selects the chart having a nonuniform color distribution, the color distribution data are read in.

When the R-gain(x,y) and the B-gain(x,y) are calculated using the formulae (15) and (16), respectively, or the formulae (19) and (20), respectively, the control circuit 205 calculates threshold rmin of the read in correction target image using the formula (12) similarly to the calculation circuit 101 in the first embodiment. The control circuit 205 multiplies the R value and the B value in the pixel positions in which they are larger than the threshold rmin by the calculated R-gain(x,y) and B-gain (x,y), respectively, to perform color shading correction.

Figure 12:
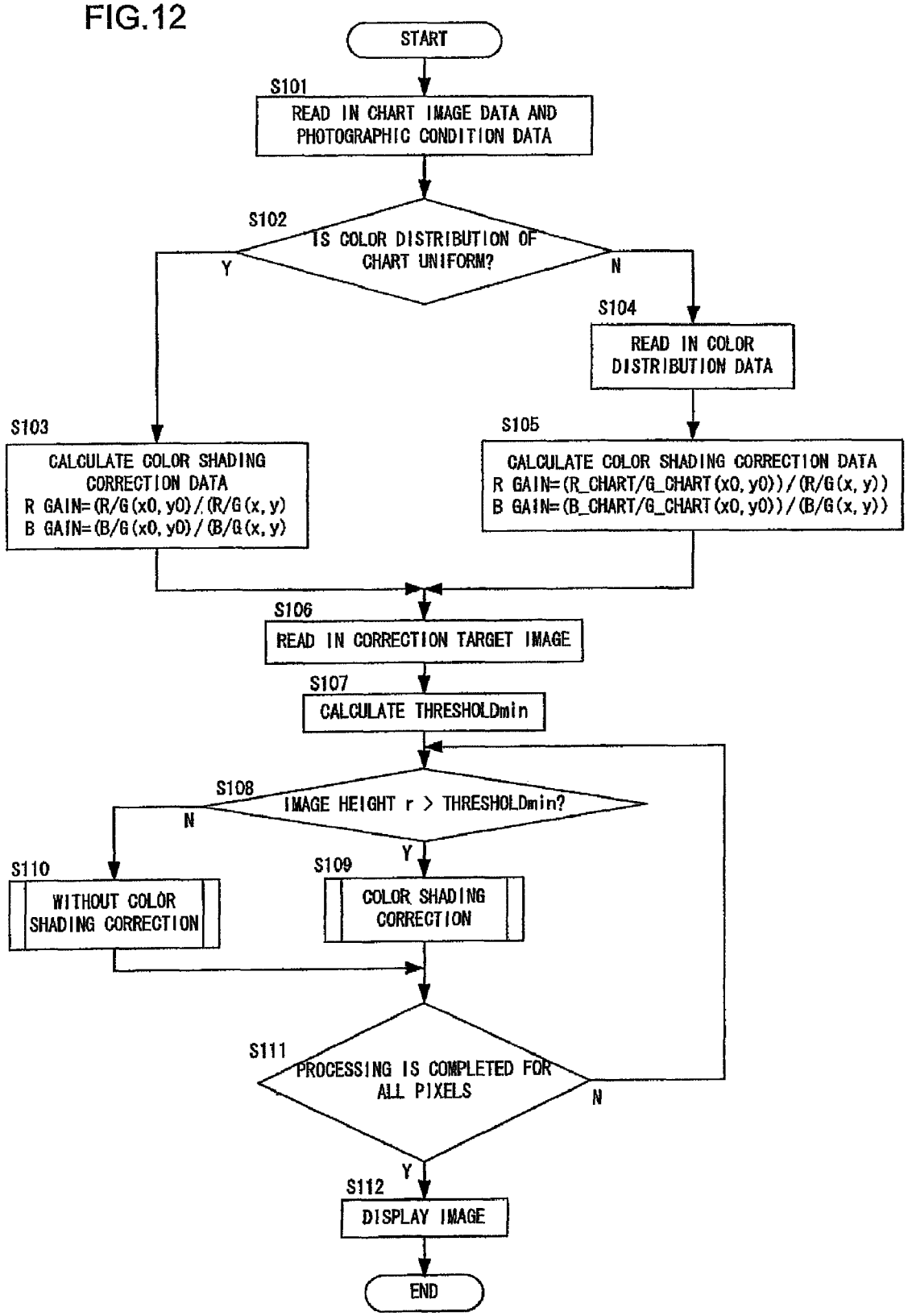
FIG. 12 is a flowchart illustrating color shading correction processing in the second embodiment.

Referring to the flowchart shown in FIG. 12, the color shading correction processing by the control circuit 205 is described. Note that the flowchart shown in FIG. 12 illustrates the processing procedure by the program executed in the control circuit 205. The program is stored in the memory 202 and started up when an operation signal that instructs execution of correction processing is input through the keyboard 204.

In a step S101, chart image data corresponding to a chart image obtained by photography of a subject having a known color distribution under uniform illumination using a photographic screen in whole and optical photographic condition data corresponding to the chart image data are read in, and the process is advanced to a step S102. In the step S102, it is decided whether or not the color distribution of the photographed chart image is uniform. Since the chart has a uniform color distribution when the instruction to read in the color distribution data are not input, the result of the decision in the step S102 is YES, and the process is advanced to a step S103. In the step S103, the color shading correction data are calculated using the formulae (19) and (20) mentioned above, and the process is advanced to a step S106.

When the instruction to read in the color distribution data are input, the result of the decision in the step S102 is NO since the color distribution of the chart is nonuniform, and the process is advanced to a step S104. In the step S104, the color distribution data are read in, and the process is advanced to a step S105. In the step S105, the color shading correction data are calculated using the formulae (15) and (16) mentioned above and the process is advanced to a step S106.

In the step S106, the correction target image is read in, and the process is advanced to a step S107. In the step S107, similarly to the step S6 in FIG. 10, the minimum image height rmin, which is a threshold, is calculated, and the process is advance to a step S108. In the step S108, similarly to the step S8, it is decided whether or not the image height r of the correction target image is larger than the threshold rmin. If the image height r is larger than the threshold rmin, the result of the decision in the step S108 is YES, and the process is advanced to a step S109. In the step S109, the R and B values in the respective pixel positions of the correction target image are multiplied by the R-gain(x,y) and the B-gain(x,y) calculated in the step S103 or the step S105 to perform color shading correction, and the process is advanced to a step S111.

On the other hand, if the image height r of the correction target image is equal to or smaller than the threshold rmin, the result of the decision in the step S108 is NO, and the process is advanced to a step S110. Each processing in the step S110 (without color shading correction) to the step S112 (image display) that is similar to each processing in the step S10

(without color shading correction) to the step S12 (image display) is performed and a series of processings is completed.

As described above, the personal computer having mounted thereon the image processing device according to the second embodiment exhibits the following advantages in addition to the effect (6) above obtained in the first embodiment.

(1) It is configured such that the control circuit 205 calculates the R-gain(x,y) and the B-gain(x,y) as color shading correction data from the first image data corresponding to the first image (chart image) obtained by photography of a chart having a known color distribution in advance. The control circuit 205 performs color shading correction for each color component of the pixel signal of the second image (correction target image) based on the calculated R and B gains. Therefore, the color shading that occurs in the photographic image can be appropriately corrected without retaining or referring to the data for correction in Tables 2 to 5 unlike the electronic camera 1 of the first embodiment.

(2) When the chart having a uniform color distribution is used as the first image data, the steps S102, S104, and S105 in FIG. 12 can be omitted, so that the color shading can be appropriately corrected with no need to retain the color distribution of the chart or to read it in freshly. Note that taking into consideration precision of the correction data, a grey, white or the like achromatic chart having equal amounts of color components of R, G, and B is suitable as the chart having a uniform color distribution. However, the chart is not limited to achromatic one so far as the color distribution is uniform. Colored charts may be usable for obtaining correction data.

Figure 13:
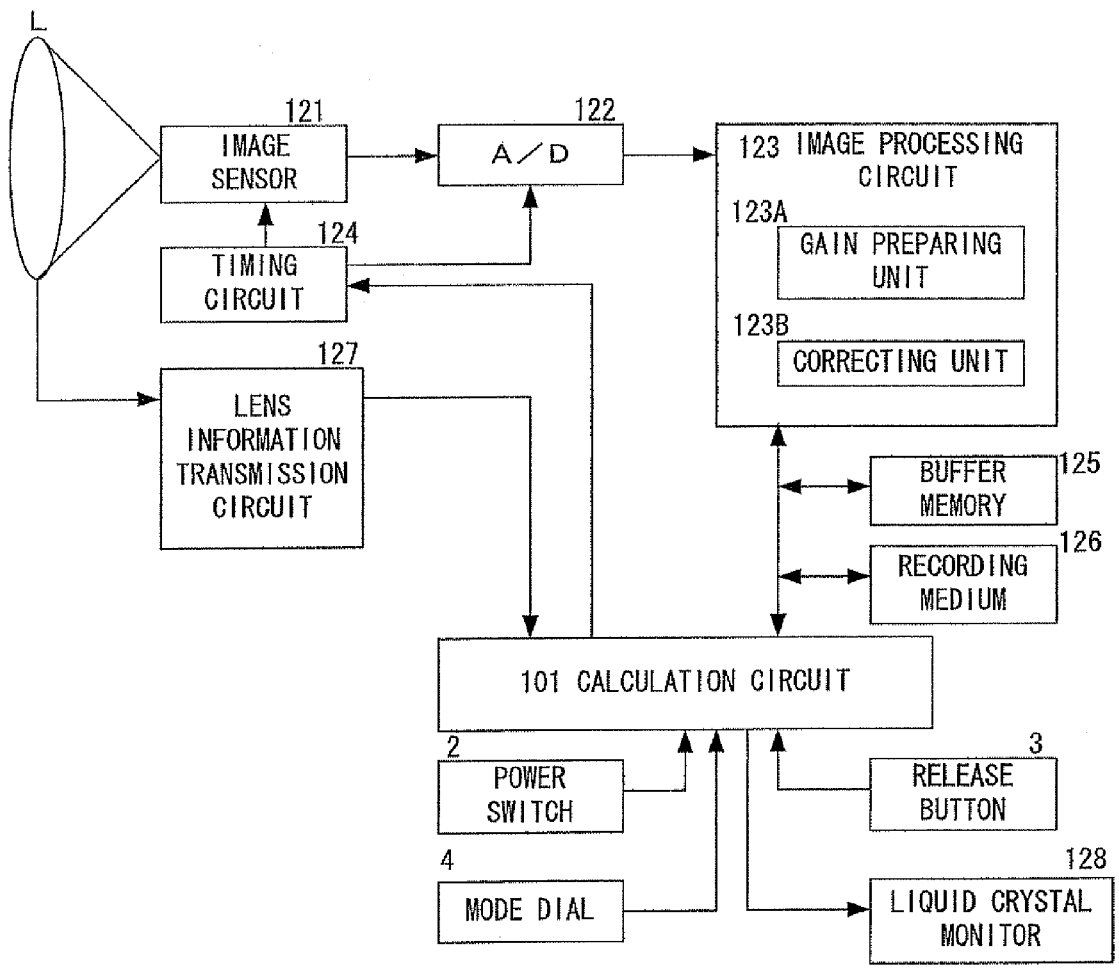
FIG. 13 is a block diagram illustrating the configuration of a main part of the electronic camera according to a modification of the second embodiment.

The image processing device that performs color shading correction processing in the above-mentioned second embodiment may be mounted on the electronic camera 1. FIG. 13 shows constituent elements of such electronic camera 1. The constituent elements that are the same as those of the electronic camera in the first embodiment are assigned the same reference numerals. Note that the electronic camera 1 is configured to have a shading correction photographic mode as one of photographic modes to enable setting of the shading correction photographic mode, for example, by operating the mode dial 4. When the shading correction photographic mode is set, the electronic camera 1 creates R and B gains from pixel signals obtained by photography of a chart having a uniform color distribution and performs color shading correction processing to a correction target image photographed under the same optical photographic condition as that when photography is performed to take an image of the chart.

As shown in FIG. 13, the image processing circuit 123 includes a gain preparing section 123A and a correction section 123B. The image processing circuit 123 includes, for example, ASIC. The gain preparing section 123A and the correction section 123B are constituted by dedicated logic circuits (hardware). Note that the image processing circuit 123 may be constituted by a DSP (Digital Signal Processor) or the like. Once the shading correction photographic mode is set, the gain preparing section 123A generates the R-gain(x, y) and the B-gain(x,y) based on the pixel signals that form the input chart image data according to the formulae (19) and (20), respectively, mentioned above. The generated R-gain(x, y) and the B-gain(x,y) are set in the correction section 123B as color shading correction data.

Subsequently, when the correction target image is photographed under the same optical photographic conditions as the chart image, the pixel signals that form the correction target image are input to the correction section 123B. The correction section 123B multiplies R value and B value of the pixel signals corresponding to the correction target image by the R-gain(x,y) and the B-gain(x,y), respectively, using the color shading correction data generated by the gain preparing section 123A to perform color shading correction. Note that the color shading correction is performed for all the pixel signals that constitute the correction target image. The image data subjected to the color shading correction processing are output to the calculation circuit 101 and subjected to various types of processing such as compression, displaying, recording and so on.

Figure 14:
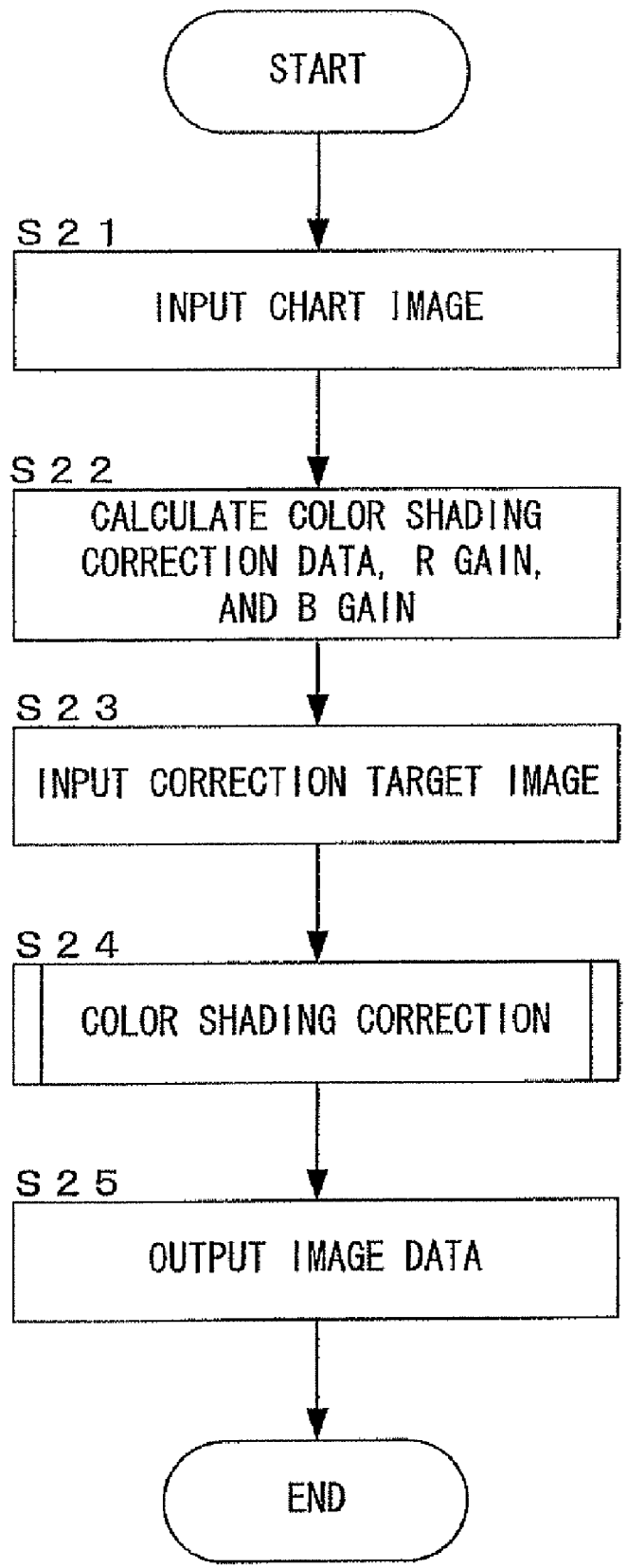
FIG. 14 is a flowchart illustrating color shading correction processing according to a modification in the second embodiment.

Explanation is made on the action of color shading correction processing in the electronic camera 1 thus far described referring to the flowchart shown in FIG. 14. Each processing shown in the flowchart in FIG. 14 is executed by the image processing circuit 123 when the shading correction photographic mode is set. In a step S21, image signals forming a chart image obtained by photography of a chart are input, and the process is advanced to a step S22. In the step S22, the input pixel signals and the formulae (19) and (20) are used to generate the color shading correction data R-gain (x,y) and B-gain(x,y), respectively, and the process is advanced to a step S23.

In the step S23, pixel signals that form the correction target image taken under the same optical photographic condition as the chart image are input, and the process is advanced to a step S 24. In the step S24, the R-gain(x,y) and the B-gain(x,y) generated in the step S22 are used to perform color shading correction to all the pixel signals that form the input correction target image, and the process is advanced to a step S25. In the step S25, the image data subjected to the color shading correction are output to the calculation circuit 101 to complete a series of processings.

In this case, if a standard chart for preparing color shading correction data are performed whenever photography of the subject is performed and real time color shading correction processing is performed whenever photography is performed, photographic performance is influenced by calculation time. Accordingly, it may be configured such that the two images obtained, i.e., a principal image and a reference image, are stored in pairs and they are subjected to color shading correction processing later by a personal computer or the like.

By storing R-gain(x,y) and B-gain(x,y) under various optical photographic conditions as historical information, it becomes unnecessary to load the reference image when photography is performed under the optical photographic conditions contained in the historical information. Further, tables equivalent to Tables 2 to 5 shown in FIGS. 9A to 9D can be prepared. In this case, color shading correction can be performed in the same manner as that in the first embodiment even when photography is performed under optical photographic conditions that are not contained in the historical information.

Third Embodiment

The camera with the image processing device according to a third embodiment of the present invention is described focusing on differences from the first and the second embodiments. The electronic camera 1 in the third embodiment is assumed to include the same constituent elements as those of the electronic camera in the first embodiment shown in FIGS. 1 and 2. The electronic camera 1 is configured to calculate R and B gain functions referring to data for correction (Tables 2 to 5) according to the formulae (1) and (2), respectively, in the same manner as in that in the first embodiment and correct the obtained R and B gain functions with R and B gains, respectively, which are color shading correction data calculated based on a chart image according to the formulae (15) and (16), respectively, or the formulae (19) and (20), respectively, in the same manner as that in the second embodiment.

Then, color shading of a correction target image is corrected with the corrected R and B gain functions. That is, the R and B gain functions, which are calculated from data for correction that are averaged out per model of the electronic camera 1, are corrected to calculate color shading correction data that enables corrections of color shading depending on an individual difference of each electronic camera 1. Further, correction becomes possible even when color shading that is not in rotational symmetry occurs on the photographic screen.

First, explanation is made on calculation of correction functions R_calib(x,y) and B_calib(x,y) for correcting the R-gain-function(r) and the B-gain-function(r), respectively, which are color shading correction data with reference to FIG. 2. The electronic camera 1 has a correction function calculation mode in addition to a photographic mode and a reproduction mode, and the correction function calculation mode can be set, for example, by operation of the mode dial 4. When a signal indicating that the correction function calculation mode is set is input to the calculation circuit 101 from the mode dial 4, the calculation circuit 101 reads in the chart image obtained by photography of the chart having a known color distribution and the optical photographic condition data in the same manner as in the second embodiment. Then, the calculation circuit 101 calculates R-gain1 (x,y) and B-gain1 (x,y) in each pixel positions (x,y) using the formulae (15) and (16), respectively, or the formulae (19) and (20), respectively.

The electronic camera 1 according to the third embodiment, like the electronic camera 1 according to the first embodiment, stores in advance Tables 2 to 5 depending on the model of the electronic camera 1 in a predetermined storage area in the calculation circuit 101. The calculation circuit 101 calculates coefficients "a" to "d" based on the aperture value and the exit pupil position upon photography of a chart image recorded in the read in optical photographic condition data with reference to Tables 2 to 5. The calculation circuit 101 calculates R-gain2(x,y) and B-gain2(x,y) in each pixel position (x,y) of the chart image using the formulae (1) and (2), respectively. Note that when the position $P_0$ of the exit pupil 133 is remoter from the photographic screen, the incidence angle is smaller in the same manner as that in the first embodiment mentioned above, so that the influence of color shading can be ignored. Accordingly, the calculation circuit 101 sets the R-gain2(x,y) and the B-gain2(x,y) as indicated by formula (21) below.

$$R\text{-gain}2(x,y)=\text{the } B\text{-gain}2(x,y)=1 \tag{21}$$

Based on the R-gain1(x,y), B-gain1(x,y), R-gain2 (x,y), and B-gain2 (x,y) calculated as mentioned above, the calculation circuit 101 calculates correction functions R_calib(x,y) and B_calib(x,y) according to the formulae (22) and (23), respectively, below.

$$R\_\text{calib}(x,y)=R\text{-gain}1(x,y)/R\text{-gain}2(x,y) \tag{22}$$

$$B\_\text{calib}(x,y)=B\text{-gain}1(x,y)/B\text{-gain}2(x,y) \tag{23}$$

The calculated R_calib(x,y) and B_calib(x,y) are recorded by the calculation circuit 101 in the recording medium 126. The calculation circuit 101 uses the correction functions R_calib(x,y) and B_calib(x,y) to correct the R-gain-function and the B-gain-function, respectively, that are calculated form the correction target image in the same manner as that in the first embodiment. Since the correction functions are applicable when the optical photographic conditions of the chart image are different from the optical photographic conditions of the correction target image, it is only needed to perform calculation processing at least once. Note that a plurality of correction functions calculated using a plurality of chart images obtained under different optical photographic conditions may be stored. In this case, the calculation circuit 101 may be configured to correct the R-gain-function and the B-gain-function of the correction target image by using the correction function calculated based on the chart image photographed under optical photographic conditions close to the optical photographic conditions for the correction target image.

Now, the color shading correction processing by the calculation circuit 101 is described. The calculation circuit 101 reads in the image data of the correction target image obtained by photography. Further, the calculation circuit 101 receives the exit pupil position and the aperture value at the time when the correction target image is taken from the lens side and reads them in, in the same manner as that in the first embodiment. The calculation circuit 101 calculates the coefficients "a" to "d" based on the aperture value and the exit pupil position transmitted from the lens side referring to Tables 2 to 5 stored in advance to calculate the R-gain(r) and the B-gain (r) of the correction target image.

The calculation circuit 101 reads out the correction functions R_calib(x,y) and B_calib(x,y) stored in the recording medium 126. As shown in the formulae (24) and (25) below, the calculation circuit 101 multiplies the R-gain(r) and the B-gain(r) by the correction functions R_calib(x,y) and B_calib(x,y), respectively, to calculate color shading correction data, R-gain-h(x,y) and B-gain-h(x,y), respectively.

$$R\text{-gain-}h(x,y)=R\text{-gain}(r)\times R\_\text{calib}(x,y) \tag{24}$$

$$B\text{-gain-}h(x,y)=B\text{-gain}(r)\times B\_\text{calib}(x,y) \tag{25}$$

The calculation circuit 101 performs color shading correction by multiplying the R value and the B value in each pixel position of the correction target image by the R-gain-h(x,y) and the B-gain-h (x,y), respectively, which are the calculated color shading correction data. The color shading correction processing is performed for all the pixel signals that form the target correction image.

Figure 15:
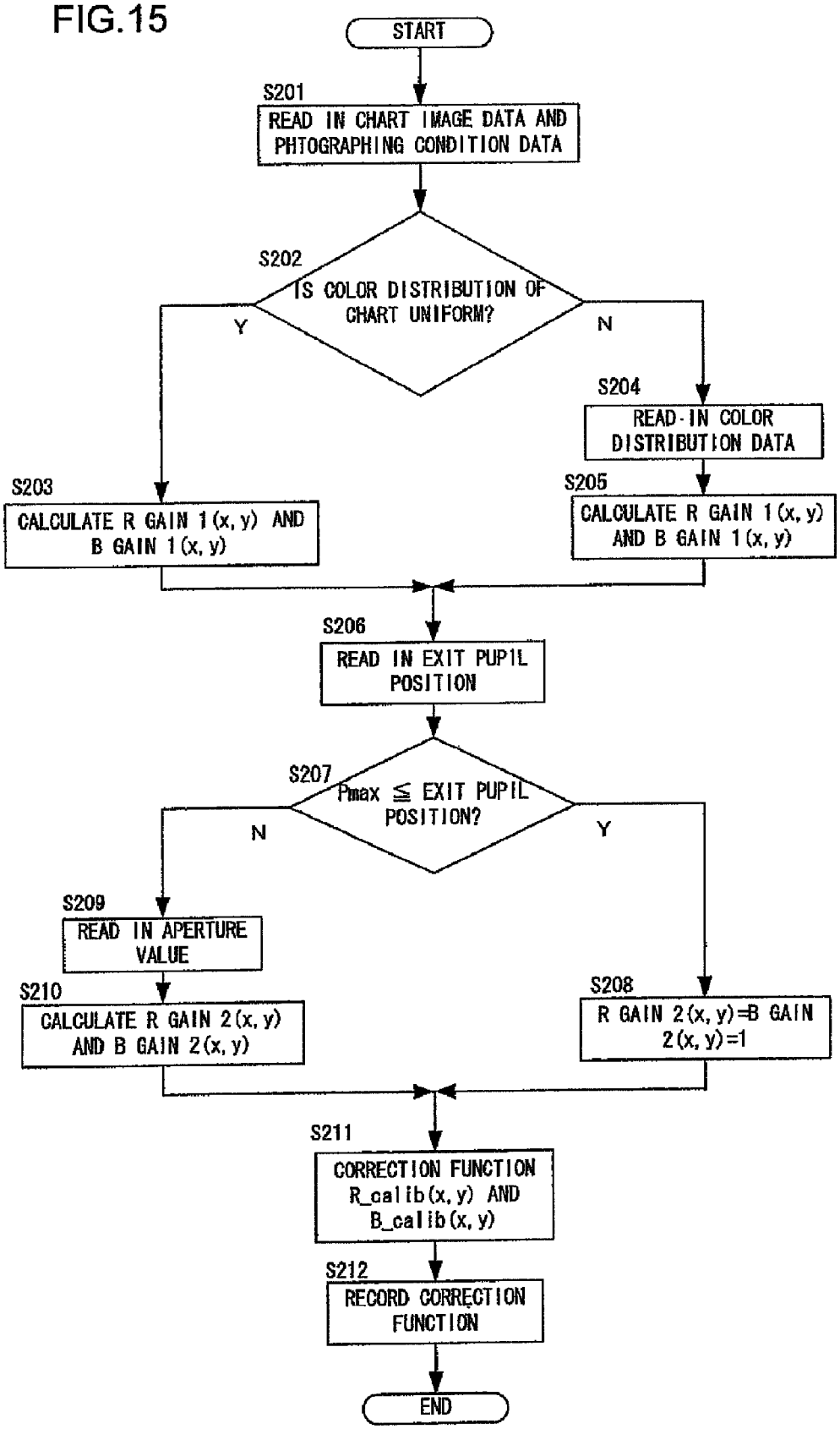
FIG. 15 is a flowchart illustrating calculation processing for calculating a correction function in a third embodiment.

The calculation processing for calculating the correction functions in the electronic camera 1 according to the third embodiment mentioned above is described referring to the flowchart shown in FIG. 15. Note that the flowchart shown in FIG. 15 illustrates a procedure by a program that is executed in the calculation circuit 101. The program is recorded in the memory (not shown) and is started up when a signal indicating that a correction function calculation mode is set is input therein through the mode dial 4.

Each processing in a step S201 (reading in of chart image data and optical photographic condition data) to a step S205 (calculation of R-gain1(x,y) and B-gain1(x,y)) is performed similarly to each processing in the step S101 (reading in of the chart image data and the optical photographic condition data) to the step S105 (calculation of the color shading correction data). In a step S206, the exit pupil position contained in the optical photographic condition data read in during the step S201 are read in, and the process is advanced to a step S207.

In the step S207, it is decided whether or not the exit pupil position is equal to or larger than the predetermined threshold Pmax similarly to the step S3 in FIG. 10. If the exit pupil position is equal to or larger than the threshold Pmax, the result of the decision in the step S207 is YES, and the process is advanced to a step S208. In the step S208, the R-gain2 (x,y) and the B-gain2 (x,y) are each set to 1 as shown in the formula (21), and the process is advanced to a step S211. If the exit pupil position is below the threshold Pmax, the result of the decision in the step 207 is NO, and the process is advanced to a step S209. In the step S209, the aperture value upon photography of the chart image contained in the optical photographic condition data are read out, and the process is advanced to a step S210.

In the step S210, the R-gain2(x,y) and the B-gain2 (x,y) are calculated according to the formulae (1) and (2), respectively, and the process is advanced to the step S211. In the step S211, correction functions R_calib(x,y) and B_calib(x,y) are calculated based on the R-gain1(x,y) and the B-gain1(x,y), respectively, calculated in the step S203 or the step S205 and the R-gain2(x,y) and the B-gain2(x,y) calculated in the step S208 or the S210 according to the formulae (22) and (23), respectively, and the process is advanced to a step S212. In the step 212, the correction functions R_calib(x,y) and B_calib(x,y) calculated in the step S211 are recorded in the recording medium 126, and a series of processing is ended.

Figure 16:
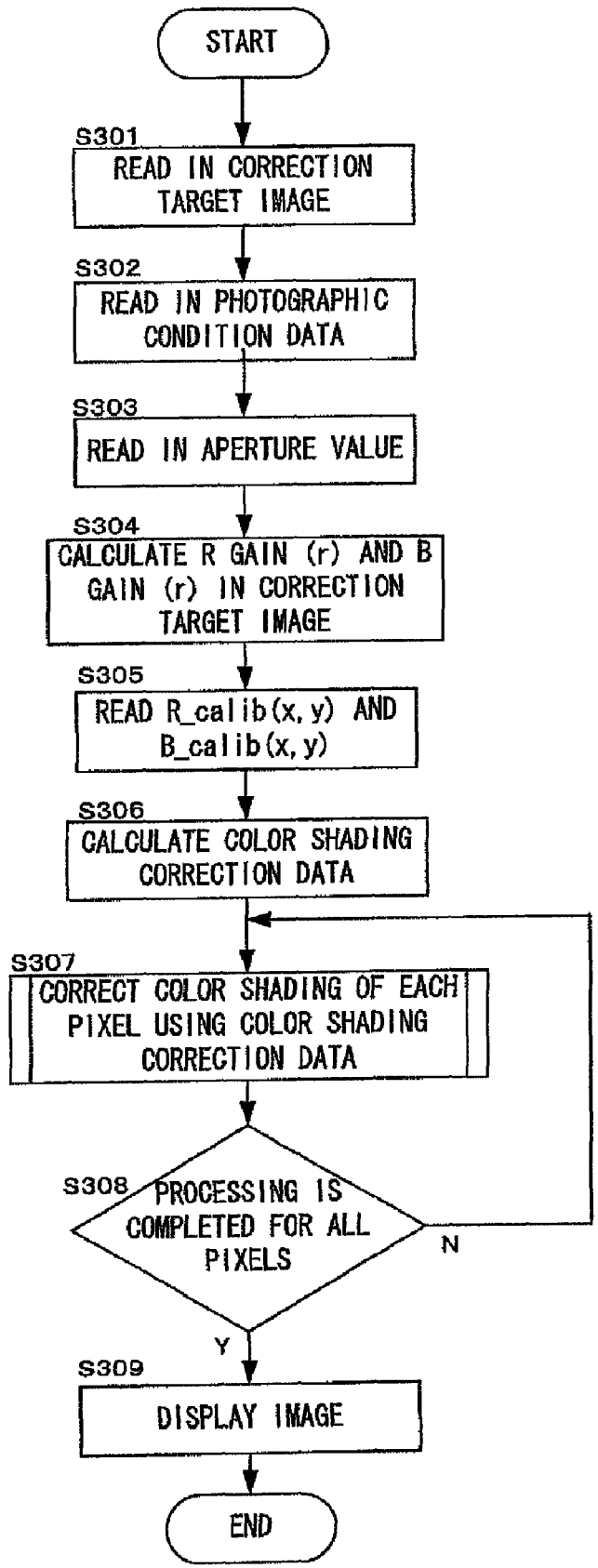
FIG. 16 is a flowchart illustrating the color shading correction processing in the third embodiment.

Then, the color shading correction processing in the electronic camera 1 according to the third embodiment is described referring to the flowchart shown in FIG. 16. Each processing in FIG. 16 is performed by executing the program in the calculation circuit 101. The program is stored in a memory (not shown) and started up when an image that is a correction target image is photographed.

Each processing in a step S301 (reading in of a correction target image) and a step S302 (reading in of optical photographic condition date) is performed similarly to each processing in the step S1 (reading in of the correction target image) and the step S2 (reading in of the optical photographic condition data) in FIG. 10. In a step S303, the aperture value at the time upon photography of the correction target image is read in, and the process is advanced to a step S304. In the step S304, the R-gain(r) and the B-gain(r) of the correction target image are calculated based on the exit pupil position and the aperture value read in according to the formulae (1) and (2) respectively, and the process is advanced to a step S305.

In the step S305, the correction functions R_calib(x,y) and B_calib(x,y) recorded in the recording medium 126 are read out, and the process is advanced to a step S 306. In the step S306, color shading correction data, R-gain-h(x,y) and B-gain-h(x,y), are calculated according to the formulae (24) and (25), respectively, based on the R-gain(r) and the B-gain (r), respectively, calculated in the step S304 and on the correction functions R_calib(x,y) and B_calib(x,y), respectively, read in during the step S305, and the process is advanced to a step S307.

In the step S307, the R value and the B value at each pixel position of the correction target image are multiplied by the color shading correction data, R-gain-h(x,y) and B-gain-h(x, y), respectively, calculated in the step S306 to perform color shading correction, and the process is advanced to a step S308. Each processing in the step S308 (decision as to whether or not processing is completed for all the pixels) and the step S309 (image display) is performed similarly to each processing in the step S11 (decision as to whether or not processing is completed for all the pixels) and the step S12 (image display) in FIG. 10, and a series of processing is ended.

The camera 1 according to the third embodiment as mentioned above provides the following advantages.

(1) The calculation circuit 101 is configured to update the R-gain2(x,y) and the B-gain2(x,y) calculated referring to Tables 2 to 5, which are data for correction stored in advance using the R-gain1(x,y) and the B-gain1(x,y), respectively, calculated using the chart image data to calculate correction functions. Also, the calculation circuit 101 is configured to correct color shading for each color component of the image signals of the correction target image using the optical photographic conditions of the correction target image and the calculated correction functions. Therefore, correction is performed using optimal data for individual models of the electronic camera 1 even when there are observed individual differences in color shading characteristics despite of the same model being used or even when precision of correction data retained in advance is low, so that the precision of correction can be improved.

(2) The calculation circuit 101 is configured to perform color shading correction for all the pixel signals of the correction target image. Therefore, even when there is color shading that does not depend on the image height, such as one due to unevenness in spectral sensitivity of the image sensor 121, correction is exactly performed, so that an image having a high image quality overall the screen can be obtained.

The present invention can be practiced in the following aspects.

Figure 11:
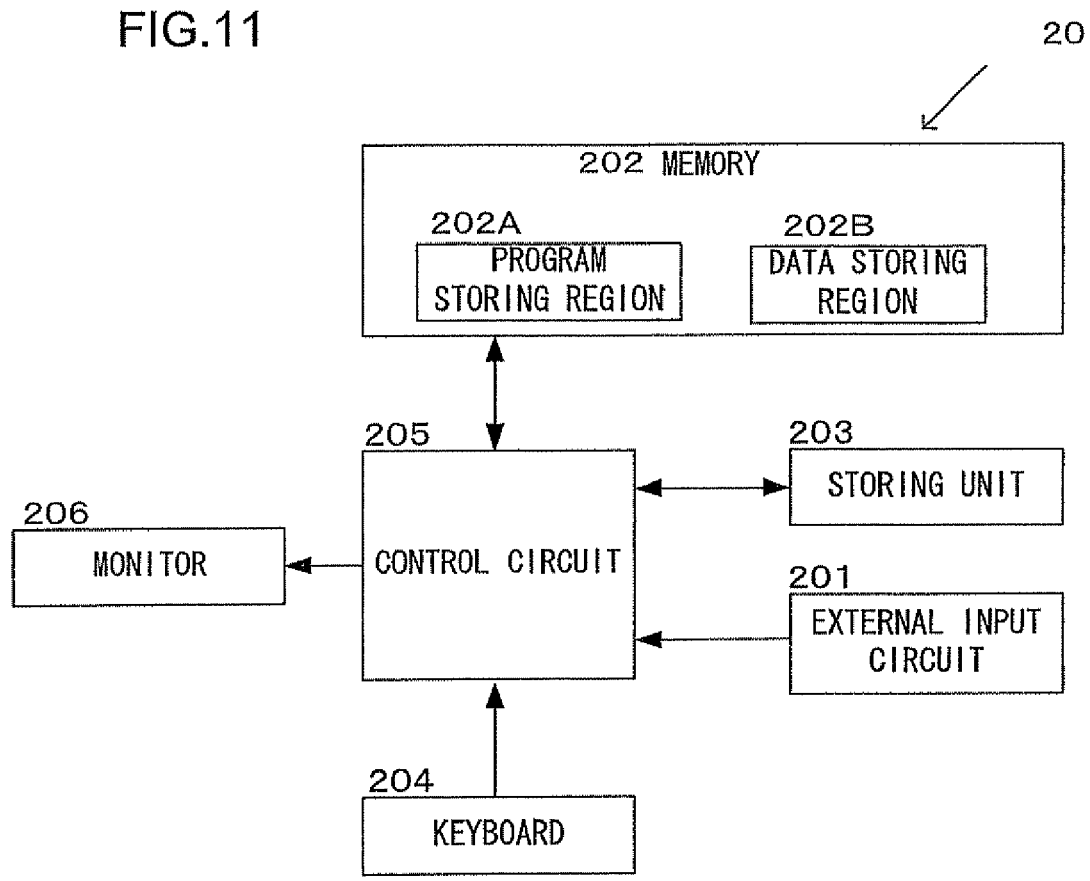
FIG. 11 is a block diagram illustrating the configuration of a main part of a personal computer in a second embodiment.

(1) Although the program for correcting color shading is executed by the electronic camera 1 that retains the data for correction therein in the first embodiment, the personal computer 20 as shown in FIG. 11 may be used as in the second embodiment. That is, the color shading correction processing of the image data of the image taken may be executed using the personal computer 20 having stored therein the data for correction. In this case, the correction is performed as follows.

In the memory section 203 in the personal computer 20 shown in FIG. 11, there are stored in advance Tables 1 to 5, data for color shading correction, for every type of the electronic camera 1. The program by which the control circuit 205 executes the processing shown in the flowchart of FIG. 10 is stored in the program storage area 202A of the memory 202. In the correction target image, there are recorded data indicating optical photographic conditions including lens type, focal length, camera-to-subject distance, and aperture value as well as camera model in relation to image data. The correction target image loaded in the personal computer 20 through the external input circuit 201 are stored by the control circuit 205 in the data storage area 202B of the memory 202. The control circuit 205 performs correction data decision processing by selecting Table 1 based on the lens type, selecting a table to be used from Tables 2 to 5 based on the camera model, and calculating coefficients "a" to "d" referring to Tables 1 to 5 to obtain R gain and B gain. The control circuit 205 performs correction execution decision processing to decide whether to execute correction for each pixel signal that forms the correction target image based on the image height calculated from the exit pupil position and the aperture value. Further, the control circuit 205 performs color shading correction processing on the pixel signal for which execution of correction is decided in the correction execution decision processing. In this manner, the color shading correction can be executed by the personal computer 20 without fail even for an image taken by using a different camera or lens.

(2) Also in the third embodiment, the processing performed by execution of the program in the electronic camera 1 may be executed by the personal computer 20 similarly to (1) above. In this case, in the program storage area 202A of the memory 202 in the personal computer 20, there is stored in advance the program executing the procedures shown in the flowcharts in FIGS. 15 and 16. In the memory section 203, there are stored in advance the chart image, the optical photographic condition data, and the data for correction, Tables 2 to 5. Then, the control circuit 205 performs correction data acquisition processing to read in the chart image and the optical photographic condition data in the data storage area 202B of the memory 202. The control circuit 205 calculates correction functions using the chart image read in in the memory 202 according to the above-mentioned program and performs modification processing using the calculated correction functions to modify the color shading correction data calculated based on the data for correction stored in advance. Finally, the control circuit 205 executes color shading correction processing using the modified correction data on the correction target image acquired through the external input circuit 201. In this method, images taken by electronic cameras to which color shading gives different influences can be corrected always at the same quality.

Figure 17:
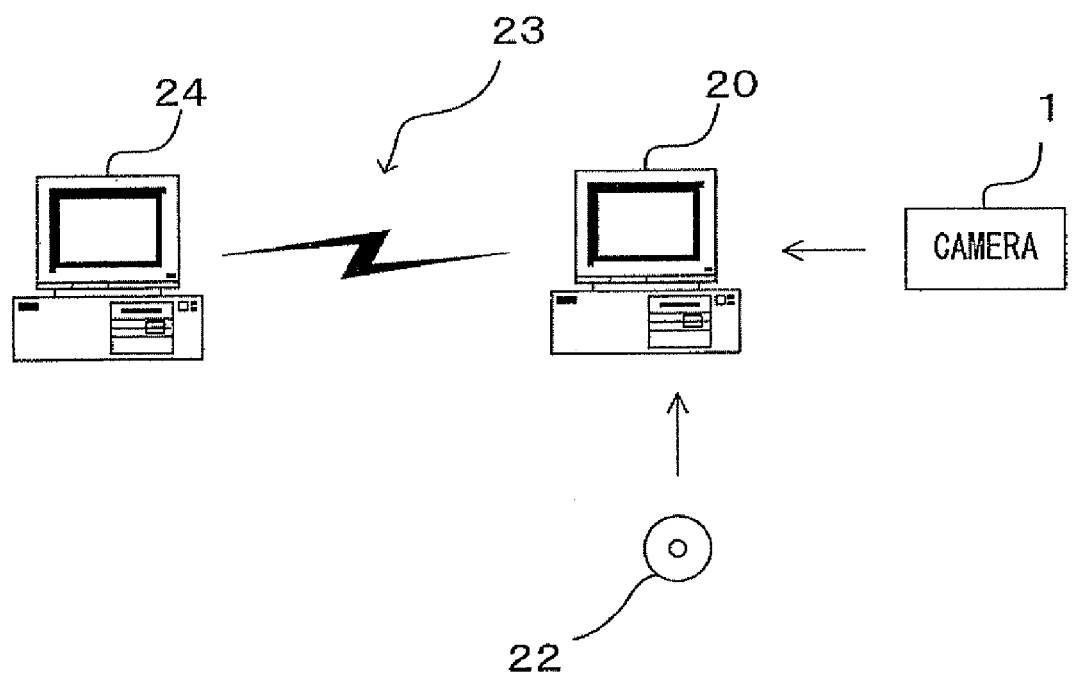
FIG. 17 is a diagram illustrating a configuration of equipment in whole used for providing a program product.

(3) When applied to the personal computer 20 or the like, the program relating to the above-mentioned control can be furnished through a recording medium such as a CD-ROM or data signals over the Internet. FIG. 17 illustrates the manner of such. The personal computer 20 is furnished with the program through the CD-ROM 22. The personal computer 20 has a capability of being connected to the communication line 23. The computer 24 is a server computer that provides the program and stores the program in a recording medium such as the hard disk 22. The communication line 23 includes the Internet, communication line such as personal computer communication, and a dedicated communication line. The computer 24 reads out the program using the hard disk 22 and transmits the program to the personal computer 20 through the communication line 23. That is, the computer 24 transmits the program as data signals on a carrier wave through the communication line 23. In this manner, the program can be provided as a computer-readable computer program product in various forms including a recording medium and a carrier wave.

(4) In the electronic cameras 1 according to the first and the third embodiment, the program of the present invention executed in the electronic camera 1 is loaded on a ROM usually upon production. However, the ROM loading the program may be a rewritable ROM, which can be connected to the personal computer 20 in a configuration similar to that shown in FIG. 17 in order to provide an improved program from a recording medium such as a CD-ROM through the personal computer 20. Further, the improved program may be provided through the Internet or the like in the same manner as mentioned above.

(5) In the electronic camera 1 according to the first embodiment, the calculation circuit 101 may execute the color shading correction processing and the white balance processing in combination. In this case, the calculation circuit 101 calculates white balance correction values R_wb and B_wb by which the R value and the B value, respectively, of the pixel signals are to be multiplied by known white balance processing. The calculation circuit 101 performs white balance processing in compensation for not performing color shading correction in the step S4 shown in the flowchart in FIG. 10. Further, the calculation circuit 101 performs color shading correction processing in the step S9 by multiplying the R value and the B value in each pixel position by respective correction values obtained by multiplying the R-gain(r) and the B-gain(r) calculated in the step S7 by white balance correction values R_wb and B_wb, respectively.

(6) In the second embodiment, the control circuit 205 may be configured not to perform decision as to whether or not correction is to be executed in the correction target image but to perform color shading correction on the pixel signals in all the pixel positions. That is, the processing in the step S108 and the step S110 in the flowchart shown in FIG. 12 may be omitted. When a component that does not depend on the incidence angle of the image sensor 121, such as spectral sensitivity distribution unevenness of the image sensor 121, has a significant impact, color shading occurs also in a component other than rotation symmetry component. This component cannot be expressed by a function of the image height r and appears two-dimensional in the screen. In such a case, it is desirable that color shading correction is performed on all the pixels as mentioned above.

(7) In the third embodiment, when the calculated correction functions R_calib(x,y) and B_calib(x,y) can be expressed as functions of the image height r, correction of the color shading correction data will be principally correction of the coefficients obtained from Tables 2 to 5. Therefore, the color shading correction can be omitted for the case in which the exit pupil distance is long and the case in which the image height is small similarly to the first embodiment in order to speed up the processing.

(8) In the third embodiment, a chart image or images obtained by photography of a uniform achromatic chart under one or more optical photographic conditions may be used as preliminarily retained data for correction in place of Tables 2 to 5 described in the first embodiment. This enables improvement in precision when the preliminarily retained chart image or images are insufficient for providing a desired correction precision.

(9) Each processing in the third embodiment may be performed by the image processing circuit of the electronic camera shown in FIG. 13.

(10) While the present invention has been explained as applicable to an electronic camera with an interchangeable lens, the present invention may also be applied to an electronic camera with a lens. In the case of the electronic camera with a lens, it is only necessary to store a set of Tables 1 to 5 mentioned above in the camera to allow the calculation circuit 101 in order to calculate exit pupil position using the optical photographic conditions and Table 1.

(11) Although explanation has been focused on the image sensor with RGB filters, the present invention is also applicable to image sensors with various color separation filters including complementary color filters.

While various embodiments and modifications have been explained above, the present invention is not limited thereto and other modes conceivable within the technical concepts of the present invention should be included in the present invention.

What is claimed is:

1. An image processing device that performs a color shading correction for a plurality of pixel signals output from an imaging sensor with a color separator, the imaging sensor capturing a subject via an optical system and outputting the pixel signals forming an image and being influenced by the color shading depending on optical characteristics of the optical system and optical characteristics of the color separator, the image processing device comprising:
   a data obtaining unit that obtains a first image having a color distribution that is known in advance;
   a decision making unit that decides whether or not the color distribution of the first image obtained by the data obtaining unit is uniform;
   a correction data obtaining unit that obtains correction data by using the first image if the color distribution is decided to be uniform, and that obtains the plurality of correction data by using the first image and color distribution data regarding the first image if the color distribution is decided not to be uniform;

a correction execution decision unit that decides that the color shading correction is to be executed for the pixel signals in a peripheral area of a second image and decides that the color shading correction is not to be executed for the pixel signals in a respectively central area of the second image; and a correction unit that corrects each color component of the plurality of pixel signals of the second image for which the color shading correction is decided to be executed by the color shading correction execution decision unit, by using the correction data obtained by the correction data obtaining unit.

2. An image processing device according to claim 1, wherein
the correction data obtaining unit obtains the correction data for each color component suitable for a predetermined optical photographic condition for each of the plurality of pixel signals using the first image obtained by capturing a subject having a known color distribution under the predetermined optical photographic condition, and
the correction unit corrects for each color component of a plurality of image signals that form the second image obtained under the same optical photographic condition as the predetermined optical photographic condition based on the correction data.

3. An image processing device according to claim 1, further comprising:
an updating unit that updates data relating to correction stored in advance based on the first image to generate the correction data, wherein
the correction unit corrects for each color component a plurality of pixel signals that form the second image based on the optical photographic condition when the second image is obtained and the updated correction data.

4. An image processing device according to claim 1, wherein
the subject having a known color distribution is a chart having a uniform color distribution.

5. An image processing device according to claim 1, wherein
the color separator is configured to microlenses, color filters, an infrared ray cut filter and an ultraviolet ray cut filter that are disposed on the image sensor.

6. An image processing device according to claim 1, wherein
the optical photographic condition includes an exit pupil position of the optical system and an aperture value of the optical system when the image is obtained.

7. An image processing device according to claim 1, further comprising:
a size changing unit that changes a size of the peripheral area in which the color shading correction is to be executed, based upon an optical photographic condition when the second image was captured.

8. An image processing device according to claim 1, wherein:
each set of the correction data is suitable for an optical photographic condition for each of the plurality of pixel signals and is different from each other in each color component.

9. An image processing method that performs a color shading correction for an image formed by a plurality of pixel signals output from an imaging sensor with a color separator, the imaging sensor capturing a subject via an optical system and outputting the pixel signals forming an image and being influenced by the color shading depending on optical characteristics of the optical system and optical characteristics of the color separator, the image processing method comprising:
obtaining a first image having a color distribution that is known in advance;
deciding whether or not the color distribution of the obtained first image is uniform;
obtaining the first image if the color distribution is decided to be uniform and obtaining the plurality of correction data by using the first image and color distribution data regarding the first image if the color distribution is decided not to be uniform;
deciding that the color shading correction is to be executed for the pixel signals in a peripheral area of a second image and is not to be executed for the pixel signals in a respectively central area of the second image; and
correcting for each color component of the plurality of pixel signals forming the second image for which the color shading correction is decided to be executed, by using the obtained correction data.

10. An image processing method according to claim 9, wherein
the correction data for each color component suitable for a predetermined optical photographic condition is obtained for each of the plurality of pixel signals using the first image obtained by capturing a subject having a known color distribution under the predetermined optical photographic condition, and
a plurality of image signals that form the second image obtained under the same optical photographic condition as the predetermined optical photographic condition are corrected for each color component based on the correction data.

11. An image processing method according to claim 9, wherein
data relating to correction stored in advance is updated based on the first image to generate the correction data, and
a plurality of pixel signals that form the second image is corrected for each color component based on the optical photographic condition when the second image is obtained and the updated correction data.

12. An image processing method according to claim 9, wherein
the subject having a known color distribution is a chart having a uniform color distribution.

13. An image processing method according to claim 9, further comprising:
changing a size of the peripheral area in which the color shading correction is to be executed, based upon an optical photographic condition when the second image was captured.

14. An image processing method according to claim 9, wherein:
each set of the correction data is suitable for an optical photographic condition for each of the plurality of pixel signals and is different from each other in each color component.

15. A non-transitory computer readable medium on which is stored an image processing program adapted to cause a computer to execute an image processing method that performs a color shading correction for an image formed by a plurality of pixel signals output from an imaging sensor with a color separator, the imaging sensor capturing a subject via an optical system and outputting the pixel signals forming an image and being influenced by the color shading depending on optical characteristics of the optical system and optical characteristics of the color separator, the image processing method comprising:

obtaining a first image having a color distribution that is known in advance;

deciding whether or not the color distribution of the obtained first image is uniform;

Obtaining correction data by using the first image if the color distribution is decided to be uniform and obtaining the plurality of correction data by using the first image and color distribution data regarding the first image if the color distribution is decided not to be uniform;

Deciding that the color shading correction is to be executed for the pixel signals in a peripheral area of a second image and is not to be executed for the pixel signals in a respectively central area of the second image; and Correcting for each color component of the plurality of pixel signals forming the second image for which the color shading correction is decided to be executed, by using the obtained correction data.

* * * * *